(12) United States Patent
Chinoy

(10) Patent No.: US 12,037,132 B1
(45) Date of Patent: *Jul. 16, 2024

(54) SYSTEM AND METHOD FOR ENABLING AN AUTHORIZED OPERATOR OF A CONTROL SYSTEM TO REMOTELY REESTABLISH COMMUNICATION WITH THE CONTROL SYSTEM WHERE A PRIMARY MEANS OF COMMUNICATION WITH THE CONTROL SYSTEM HAS BEEN LOST, HIJACKED OR OTHERWISE COMPROMISED

(71) Applicant: Rayomond H. Chinoy, Wesley Chapel, FL (US)

(72) Inventor: Rayomond H. Chinoy, Wesley Chapel, FL (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/961,054

(22) Filed: Oct. 6, 2022

Related U.S. Application Data

(63) Continuation-in-part of application No. 17/404,048, filed on Aug. 17, 2021, now Pat. No. 11,679,894, which is a continuation-in-part of application No. 15/834,746, filed on Dec. 7, 2017, now Pat. No. 11,092,957.

(60) Provisional application No. 62/475,226, filed on Mar. 23, 2017.

(51) Int. Cl.
*G08G 5/00* (2006.01)
*B64C 39/02* (2023.01)
*B64D 45/00* (2006.01)
*B64U 101/00* (2023.01)

(52) U.S. Cl.
CPC ........ *B64D 45/0018* (2019.08); *B64C 39/024* (2013.01); *G08G 5/0056* (2013.01); *B64U 2101/00* (2023.01)

(58) Field of Classification Search
CPC . B64D 45/0018; B64C 39/024; G08G 5/0056
See application file for complete search history.

(56) References Cited

U.S. PATENT DOCUMENTS

2020/0166929 A1* 5/2020 Jiwani .................... G06V 20/17

* cited by examiner

*Primary Examiner* — Ryan Rink
(74) *Attorney, Agent, or Firm* — Glenn Gold, P.A.; Glenn E. Gold

(57) ABSTRACT

A method enabling an authorized control system operator to remotely override a primary means of communication therewith, the control system including a primary controller integrated with, and configured to control an operation of a vehicle/vessel, a machine, etc. A remote controller communicates with the primary controller via a first mode of communication. An auxiliary controller module, integrated with the control system, communicates with the base controller via a different, second mode of communication, such that the auxiliary controller module functions as an emergency backup to take over control of the control system, in place of the primary controller, when, for example, the primary controller is rendered non-responsive to authorized operator-attempted communication from the remote controller to the primary controller, wherein the second mode of communication relies upon a coded messaging scheme.

18 Claims, 14 Drawing Sheets

SYSTEM AND METHOD FOR ENABLING AN AUTHORIZED OPERATOR OF A CONTROL SYSTEM TO REMOTELY REESTABLISH COMMUNICATION WITH THE CONTROL SYSTEM WHERE A PRIMARY MEANS OF COMMUNICATION WITH THE CONTROL SYSTEM HAS BEEN LOST, HIJACKED OR OTHERWISE COMPROMISED

CROSS-REFERENCE TO RELATED APPLICATIONS

This application is a continuation-in-part (CIP) of co-pending U.S. patent application Ser. No. 17/404,048, filed on Aug. 17, 2021, which is a continuation-in-part (CIP) of U.S. patent application Ser. No. 15/834,746 (now issued U.S. Pat. No. 11,092,957), filed on Dec. 7, 2017, which, in turn, claims the benefit of U.S. provisional patent application No. 62/475,226, filed on Mar. 23, 2017. The entire content of each of the above-identified patent applications is incorporated-by-reference herein.

FIELD OF THE INVENTION

The present invention generally concerns remote communications with control systems of vehicles, machines, electronic devices, industrial systems, and the like. More specifically, the invention relates to systems and methods that enable an authorized operator (i.e., of the vehicle, machine, electronic device, industrial control system, etc.) to remotely reestablish communication with a respective, corresponding control system, via a secondary means of communication, where a primary means of communication therewith has been lost, hijacked, or otherwise compromised.

BACKGROUND OF THE INVENTION

With continuing advances in technology, more and more vehicles, machines, electronic devices, industrial control systems (ICS), and the like, are being adapted to enable remote access to, and remote control of, their respective control/operating systems. While improving convenience and efficiency, providing such remote access/control has rendered the corresponding vehicles, machines, electronic devices, industrial control systems, etc. increasingly susceptible to undesirable access by bad actors.

For example, as the present applicant disclosed in his U.S. Pat. No. 11,092,957, an influx of gadgets have been specifically developed to block, or otherwise interfere with, radio frequency (RF) communication signals relied upon during operation of remotely controlled vehicles, such as unmanned aerial vehicles (UAVs). For instance, drone operations have been maliciously taken over by hijackers impersonating the remote controller and overwhelming the receiver by sending stronger signals to the device than the original transmitter, so the receiver believes it is still being governed appropriately.

However, potential hijacking-type issues are not exclusive to unmanned aerial vehicles (UAVs), such as drones. For instance, although conventional land vehicles, such as automobiles and trucks, are not "remotely controllable" in the traditional sense of the term, more and more of their onboard systems are being configured to enable remote access in connection with telematics services (i.e., vehicle systems combining GPS and cellular technologies with onboard electronics) providing, for example, in-vehicle security, emergency services, hands-free calling, turn-by-turn navigation, remote diagnostics, and the like. Increasingly, such systems are being adapted to further enable remote engine starting and shutdown, remote vehicle tracking, etc. Thus, a vehicle's telematics system, while able to notify police in the event of a crash, remotely disable a stolen vehicle, and offer diagnostic information to drivers, can also interface with multiple vehicle systems. After gaining access to the telematics system, it is possible to control the systems connected to the vehicle's Controller Area Network (CAN) bus. A hacker could, for example, disable a vehicle's ignition the same way an anti-theft system would. Consequently, such systems are becoming increasingly susceptible to undesirable outside interference, or hacking. Furthermore, so-called "autonomous" vehicles, while operating substantially on their own with little or no ongoing control from a remote operator, are susceptible to having their autonomous control taken over remotely (e.g., by a bad actor), which could have disastrous consequences.

In addition to aerial vehicles and conventional land vehicles, ocean-going vessels, such as ships and other watercraft, both submersible and non-submersible—whether autonomous or semi-autonomous—are susceptible to potentially harmful outside interference such as that described above regarding aerial and land vehicles. Moreover, even completely non-autonomous ships (e.g., oil tankers) are susceptible to having their operations taken over by modern day pirates. In 2020, there were approximately 200 pirate attacks against ships worldwide.

Furthermore, radio frequency (RF) remote controllers that are used to operate connected industrial machines are particularly susceptible to such hijacking. More rugged varieties of radio controllers used for heavy-duty purposes, such as the control and automation of industrial machines like cranes and drills, could be hijacked in several ways. RF controls use a transmitter to send out radio waves corresponding to a command—usually a press of a button—which a receiver interprets as an action; for example, opening a garage door. The industrial version of this technology—used in various sectors such as construction, manufacturing and logistics—is highly vulnerable to hijacking. In fact, it has been found that weaknesses in the controllers can be easily taken advantage of to move full-sized machines, such as cranes used on construction sites and industrial equipment used in manufacturing facilities. As in the case of aerial vehicles, controllers that use RF communication are susceptible to command spoofing, where an attacker within range can capture radio traffic, selectively modify the packets, and automatically craft new commands.

More recently, industrial control systems (ICS) have become increasingly susceptible to outside interference in the form of cyberattacks. The motives for ICS hacking primarily depend on the perpetrators and what they hope to gain from the attack. For instance, state-sponsored hacking occurs when a federal government hacks other governments in order to disrupt elections, gather intelligence, or cripple infrastructure such as a power grid. On the other hand, so-called "hacktivists" launch cyberattacks for socially or politically motivated reasons. For example, an activist group may launch a cyberattack on a manufacturing plant's systems as a form of protesting against pollution resulting from the plant's methods of production. Furthermore, so-called "black-hat" hackers may simply be motivated by the prospect of personal or financial gain. Whatever the motive, however, any successful cyberattack launched on an ICS has the potential to cause massive disruptions to the plant's processes.

The systems and methods of the present invention address the aforementioned concerns and issues, through the integration of an emergency/auxiliary override control/operating system with an existing, primary operating system to enable an authorized, rightful operator thereof to terminate operation of the primary operating system, and subsequently take over control thereof during an emergency; for example, where the existing operating system has been hijacked, or otherwise taken over, by an unauthorized operator.

SUMMARY OF THE INVENTION

Broadly, the present invention provides systems and methods for enabling an authorized operator of a control system to remotely reestablish communication with the control system where a primary means of communication therewith has been lost, hijacked or otherwise compromised.

More particularly, the present invention provides systems and methods of integrating an auxiliary controller module with a control system of a vehicle, a machine, an electronic device, an industrial control system (ICS) and the like, to enable an authorized operator of the control system to remotely disconnect a primary means of communication therewith, and substitute a secondary means of communication in place of the disconnected primary means of communication; particularly, where the authorized operator's primary means of communication with the control system has been lost, hijacked by a bad actor, or otherwise compromised. As used herein, the term "compromised" is meant to generally denote any situation in which a primary means of communication between a control system and an authorized operator of the control system has been terminated or jeopardized.

In accordance with a general implementation, a method is provided for enabling an authorized, or rightful, operator of a control/operating system to remotely reestablish communication with the control system where a primary means of communication therewith has been lost, hijacked or otherwise compromised, wherein the control/operating system includes an onboard primary controller integrated with, and adapted to control an operation of, a vehicle, a machine, an electronic device, an industrial control system (ICS), and the like. The method may include the following steps:

providing a base controller located remotely from the onboard primary controller, wherein the base controller is adapted to communicate with the onboard primary controller via a first mode of communication in order to provide operational instructions from the base controller to the onboard primary controller; and integrating an auxiliary controller module with the control system, wherein the auxiliary controller module is adapted to communicate with the base controller via a second mode of communication different from the first mode of communication between the onboard primary controller and the base controller, such that the auxiliary controller module is configured to, and functions to, enable the authorized operator to selectively disconnect the first mode of communication between the onboard primary controller and the base controller, via an auxiliary controller electronic switch, and substitute therefor the second mode of communication between the auxiliary controller module and the base controller; particularly, when the onboard primary controller is rendered non-responsive to authorized operator-attempted communication from the base controller to the onboard primary controller, or when communication between the base controller and the control system has been compromised, wherein communication from the base controller to the auxiliary controller module, via the second mode of communication, relies upon a messaging scheme requiring communication of a predetermined specific message, from the base controller to the auxiliary controller module, which activates the auxiliary controller module to disable, and take over control from, the onboard primary controller in response to receipt of the predetermined specific message, and wherein the predetermined specific message is known only by the authorized operator and by the auxiliary controller module.

In at least some implementations, communication from the base controller to the auxiliary controller module, via the second mode of communication (e.g., SMS messaging) may rely upon a coded messaging scheme requiring communication of a predetermined specific code, from the base controller to the auxiliary controller module, which activates the auxiliary controller module to disable, and take over control from, the onboard primary controller in response to receipt of the predetermined specific code, which is known only by the authorized operator and by the auxiliary controller module.

In accordance with one aspect, the onboard primary controller and the auxiliary controller module may be provided integrated into an original control/operating system or, alternatively, the auxiliary controller module may be integrated with an onboard primary controller of an existing control/operating system. That is, an existing control/operating system having an onboard primary controller may be retrofitted with the auxiliary controller module.

In another aspect, the first mode of communication between the base controller and the onboard primary controller may be any form of wireless communication; including, for example: radio frequency (RF) communications; cellular communications; satellite communications; optical communications (e.g., encoded lasers); long-range radio (LoRa) communications; long-range wide area network (LoRaWAN) communications; helium network communications (i.e., distributed network of long-range wireless hotspots); and low-bandwidth, long-distance wireless network communications (e.g., AMAZON SIDEWALK), to name just a few.

In another aspect, the second mode of communication between the base controller and the auxiliary controller module may be any form of wireless communication; including, for example: radio frequency (RF) communications; cellular communications; satellite communications; optical communications (e.g., encoded lasers); long-range radio (LoRa) communications; long-range wide area network (LoRaWAN) communications; helium network communications (i.e., distributed network of long range wireless hotspots); and low-bandwidth, long-distance wireless networks (e.g., AMAZON SIDEWALK), to name just a few.

In another aspect, the coded messaging scheme associated with the second mode of communication between the auxiliary controller module and the base controller may include a coded short message service (SMS) messaging scheme employing a predetermined specific code that activates the auxiliary controller module to take over control from the onboard primary controller in response to receipt of the specific code.

In another aspect, the coded messaging scheme associated with the second mode of communication between the auxiliary controller module and the base controller may be a coded short message service (SMS) messaging scheme employing a predetermined specific code that activates the auxiliary controller module to take over control from the onboard primary controller in response to receipt of the specific code. In that regard, in some implementations, the alternate, second mode of communication between the base controller and the auxiliary controller module may be more secure than the first mode of communication between the base controller and the onboard primary controller, since it involves sending a coded message that does not need to be written down anywhere that it could be discovered. Furthermore, on the receiving end (i.e., at the auxiliary controller module) the coded message could be salted and stored as a salted hash value to ensure that only the authorized operator has knowledge of the actual password/code. As is well known, password salting adds random characters before or after a password/code, prior to hashing, to obfuscate the actual password/code.

In another aspect, the auxiliary controller module may incorporate a global system for mobile communications (GSM) module.

In another aspect, the second mode of communication between the auxiliary controller module and the base controller may operate in accordance with a set of GSM standards utilizing a subscriber identity module (SIM) card and employing a short message service (SMS) messaging scheme that communicates with the auxiliary controller module and sends a text message to the auxiliary controller module that incorporates a predetermined authentication code and a specific code, which activate the auxiliary controller module to take over control from the onboard primary controller in response to receipt of the authentication code and the specific code.

In another aspect, the control system may be particularly adapted for controlling operation of a land vehicle, wherein the control system of the land vehicle is configured to enable remote access thereto via a telematics service.

In another aspect, the land vehicle may be an autonomous vehicle.

In another aspect, the control system may be particularly adapted for controlling operation of a water vehicle, or a vessel.

In another aspect, the vessel may be a submersible seagoing vessel or a non-submersible seagoing vessel.

In another aspect, the submersible seagoing vessel may be a self-navigating, autonomous submersible vehicle (e.g., a shallow water submersible research vessel).

In another aspect, the vessel may be a semi-autonomous vessel or a fully autonomous vessel.

In another aspect, the control system may be particularly adapted for controlling operation of a seagoing vessel, wherein the control system of the seagoing vessel is configured to enable remote access thereto via a telematics service.

In another aspect, the control system may be particularly adapted for controlling operation of an industrial system including, for example, an agricultural system, a chemical production system, a power generation system, a water treatment system, a product manufacturing facility, or a computer data processing system.

In another aspect, the control system may be particularly adapted for controlling the operation of industrial equipment and machinery including, for example, manufacturing equipment and machinery, construction equipment and machinery, agricultural equipment and machinery, military equipment and machinery, robotic equipment and machinery, biological processing equipment and machinery, chemical processing equipment and machinery, and electrical system equipment and machinery.

In another aspect, the control system may be particularly adapted for controlling the operation of an industrial control system (ICS), including ICS subsystems, devices, networks, and controls.

In another aspect, the ICS control system may be a Supervisory Control and Data Acquisition (SCADA) system, a Distributed Control System (DCS), or a hybrid thereof.

In accordance with another exemplary implementation, a method is provided for remotely reestablishing operational control of a function of an electronic device after operational control of the electronic device function has been lost, for example, due to malicious interference by a third party. The method may include the following steps:

integrating an onboard primary controller with the electronic device, wherein the onboard primary controller is adapted to control at least one operation, or function, of the electronic device;

providing a base controller adapted to communicate with the onboard primary controller via a first mode of communication in order to provide instructions by which the onboard primary controller is to control the electronic device operation(s)/function(s); and integrating an auxiliary controller module with the electronic device, wherein the auxiliary controller is adapted to communicate with the base controller via a second mode of communication different from the first mode of communication between the onboard primary controller and the base controller, such that the auxiliary controller module functions as a backup, which may disconnect the first mode of communication between the base controller and the onboard primary controller, and in its place, activate the secondary mode of communication between the base controller and the auxiliary controller module to enable the authorized operator to take over control of the electronic device operation(s)/function(s), via direct communication with the auxiliary controller module, when the electronic device operation(s)/function(s) is(are) rendered non-responsive to operator-attempted communication from the base controller to the onboard primary controller, wherein communication from the base controller to the auxiliary controller module, via the second mode of communication, relies upon a coded messaging scheme requiring communication of a predetermined specific code, from the base controller to the auxiliary controller module, which activates the auxiliary controller module to disable, and take over control from, the onboard primary controller in response to receipt of the predetermined specific code, and wherein the predetermined specific code is known only by the operator of the base controller and by the auxiliary controller module. Optionally, the predetermined specific code may be stored on the receiving end (i.e., at the auxiliary controller module) in a salted hash format for added security.

In accordance with an aspect, the electronic device may be an electrical, or electronic, device controlling a function/operation of a vehicle, a machine, or an industrial control system (ICS).

In accordance with another exemplary implementation, a method is provided for enabling an authorized operator of an industrial control system (ICS) to remotely override a primary means of communicating therewith, wherein the ICS controls one or more function(s)/operation(s) of an ICS subsystem, an ICS device, an ICS network, and/or an ICS control, and wherein the ICS includes an onboard primary controller integrated therewith. The method may include the following steps:

providing a base controller adapted to communicate with the onboard primary controller via a first mode of communication in order to provide instructions by which the onboard primary controller is to control the operation(s)/function(s) of the ICS subsystem, ICS device, ICS network and/or ICS control; and integrating an auxiliary controller module with the ICS, wherein the auxiliary controller is adapted to communicate with the base controller via a second mode of communication different from the first mode of communication between the onboard primary controller and the base controller, such that the auxiliary controller module functions as a backup to temporarily take over control of the operation(s)/function(s), in place of the onboard primary controller, when the operation(s)/function(s) is(are) rendered non-responsive to operator-attempted communication from the base controller to the onboard primary controller, wherein communication from the base controller to the auxiliary controller module, via the second mode of communication, relies upon a coded messaging scheme requiring communication of a predetermined specific code, from the base controller to the auxiliary controller module, which activates the auxiliary controller module to disable, and take over control from, the onboard primary controller in response to receipt of the predetermined specific code, and wherein the predetermined specific code is known only by the operator of the base controller and by the auxiliary controller module.

In accordance with an aspect, the industrial control system (ICS) may be an electronic access control system within a computing environment.

In accordance with another exemplary implementation wherein the ICS comprises an electronic access control system within a computing environment, the method of the present invention may be employed to enable an authorized operator of the electronic access control system to remotely override a primary means of communication therewith, wherein the electronic access control system includes an access control panel for managing what can be viewed and who can use resources in the computing environment, and wherein the electronic access control system includes an onboard primary controller integrated with, and adapted to control operation of, the access control panel. The method may include steps of:

providing a base controller located remotely from the onboard primary controller, the base controller adapted to communicate with the onboard primary controller via a first mode of communication in order to provide operational instructions from the base controller to the onboard primary controller; and integrating an auxiliary controller module with the electronic access control system, wherein the auxiliary controller module is adapted to communicate with the base controller via a second mode of communication different from the first mode of communication between the onboard primary controller and the base controller, such that the auxiliary controller module functions as an emergency backup to temporarily take over control of the electronic access control system, in place of the onboard primary controller, when the onboard primary controller is rendered non-responsive to authorized operator-attempted communication from the base controller to the onboard primary controller, wherein communication from the base controller to the auxiliary controller module, via the second mode of communication, relies upon a coded messaging scheme requiring communication of a predetermined specific code, from the base controller to the auxiliary controller module, which activates the auxiliary controller module to disable (e.g., disconnect), and take over control from, the onboard primary controller in response to receipt of the predetermined specific code, and wherein the predetermined specific code is known only by the authorized operator and by the auxiliary controller module.

In accordance with an aspect of the exemplary electronic access control system implementation, the coded messaging scheme associated with the second mode of communication between the auxiliary controller module and the base controller may be a coded short message service (SMS) messaging scheme employing a predetermined specific code that activates the auxiliary controller module to take over control from the onboard primary controller in response to receipt of the specific code.

In accordance with another aspect of the exemplary electronic access control system implementation, the auxiliary controller module may include a global system for mobile communications (GSM) module.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF EXEMPLARY IMPLEMENTATIONS

Figure 1:
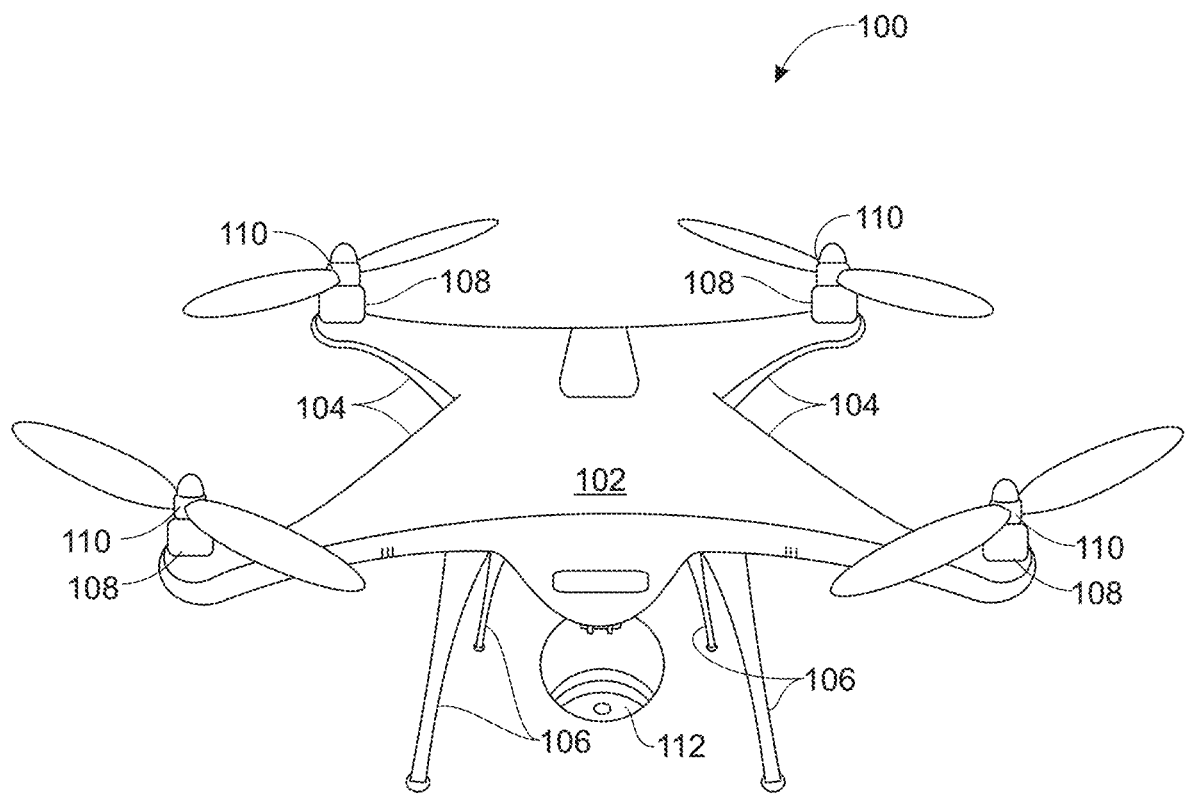
FIG. 1 is a top front view of a prior art exemplary embodiment of a remotely controlled device; namely, an unmanned aerial vehicle (UAV), or drone.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Generally, the present invention provides a unique method for enabling an authorized operator of a control system of a device to remotely override, disconnect, and/or disable a primary means of communication employed by the control system and, instead, substitute a secondary means of communication with the device. Significantly, the substituted secondary means of communication employed is unconventional, and its existence is maintained covertly, or in an otherwise concealed form, from potential hackers or other bad actors. As used herein, the term "device" is intended to denote any apparatus or system which is controlled by, or operated by, the control system (e.g., a vehicle, a machine, a system, etc.). The method may be employed to effectively terminate existing communication with the control system by any third parties; giving the authorized operator exclusive access to, and control over, the control system. Significantly, the present method may be employed to override unauthorized access to the control system by an unauthorized operator or bad actor. As used herein, the term "control system" may denote any system that is used to control the operation of a device (e.g., a vehicle, a vessel, a machine, equipment, an industrial system, a computer network, etc.); particularly, where the device being controlled includes an onboard primary controller. In some implementations, the term "onboard primary controller" may denote a primary controller carried by the device being controlled (e.g., a controller carried by, or part of, a vehicle, a machine, equipment, an industrial system, etc.). In other implementations, the term "onboard primary controller" may denote a primary controller incorporated into a main circuit board of a computer or computerized device.

The method includes a step of providing a remote controller, or a base controller, located remotely from the onboard primary controller. As used herein, the term "remote controller" is meant to broadly denote any portable device (e.g., radio transmitter/controller, smartphone, computer, etc.) adapted or otherwise configured to communicate with the onboard primary controller, via a first mode of communication that is the default mode used by the primary controller to receive and/or send information, in a manner enabling the remote controller to provide operational instructions to the onboard primary controller. In at least some implementations (e.g., the UAV navigation controller system), the remote controller may be referred to as a "base controller."

The method further includes a step of integrating an auxiliary, or secondary, controller module with the control system, wherein the auxiliary controller module is adapted or otherwise configured to enable communication with the remote controller via a second mode of communication different than the first mode of communication between the remote controller and the onboard primary controller. In this manner, the auxiliary controller module may function as a means for enabling an authorized operator of the device being controlled to indirectly disable the onboard primary controller and subsequently function in its place to enable communication (i.e., via the second mode of communication) between the remote controller and the control system, and, consequently, operation of the device being controlled by the control system—particularly, where the onboard primary controller has been rendered non-responsive to authorized operator-attempted communication from the remote controller (e.g., where communication between the base controller and the primary controller has been hijacked by a bad actor).

Significantly, communication from the remote controller to the auxiliary controller module, via the second mode of communication, relies upon a coded messaging scheme requiring communication of a predetermined specific code, from the remote controller to the auxiliary controller module, which activates the auxiliary controller module to disable—and optionally take over control from—the onboard primary controller in response to receipt of the predetermined specific code. Furthermore, the predetermined specific code may be known only by the authorized operator and by the auxiliary controller module.

Figure 7:
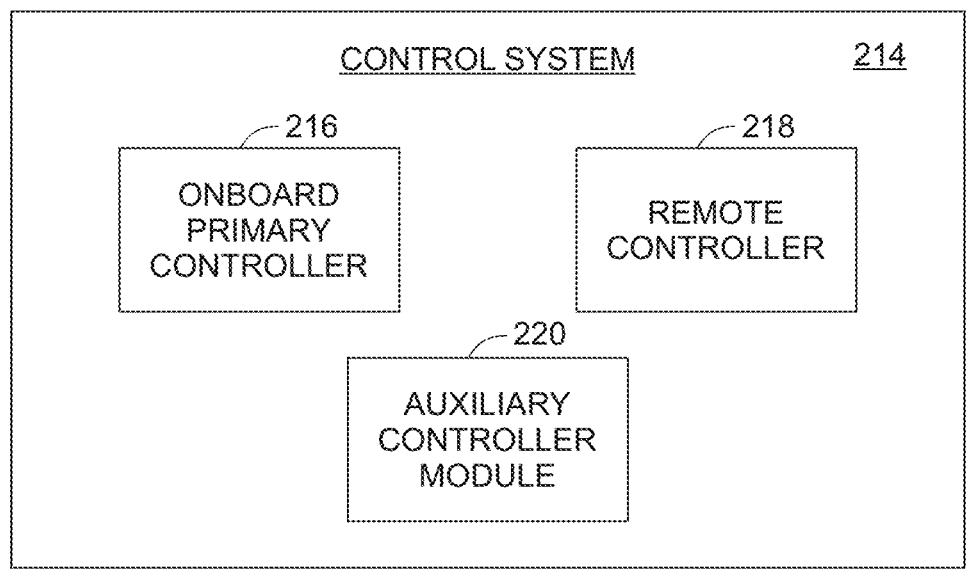
FIG. 7 is a block diagram of a control system incorporating an auxiliary controller module, in accordance with a general implementation of the present invention.
Figure 8:
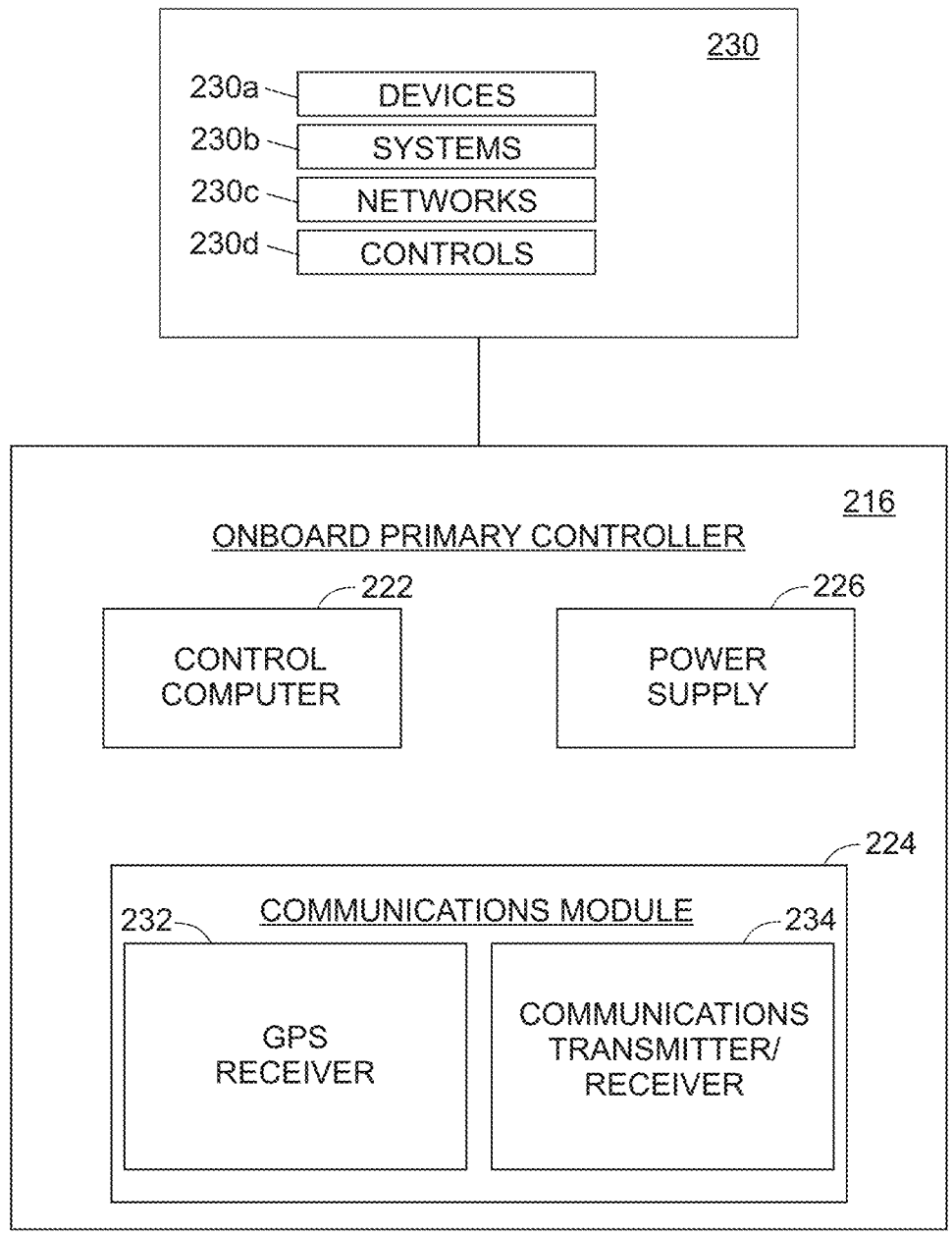
FIG. 8 is a detailed block diagram of an exemplary embodiment of an onboard primary controller, which may be one of the components of the operational control system of the present invention.
Figure 9:
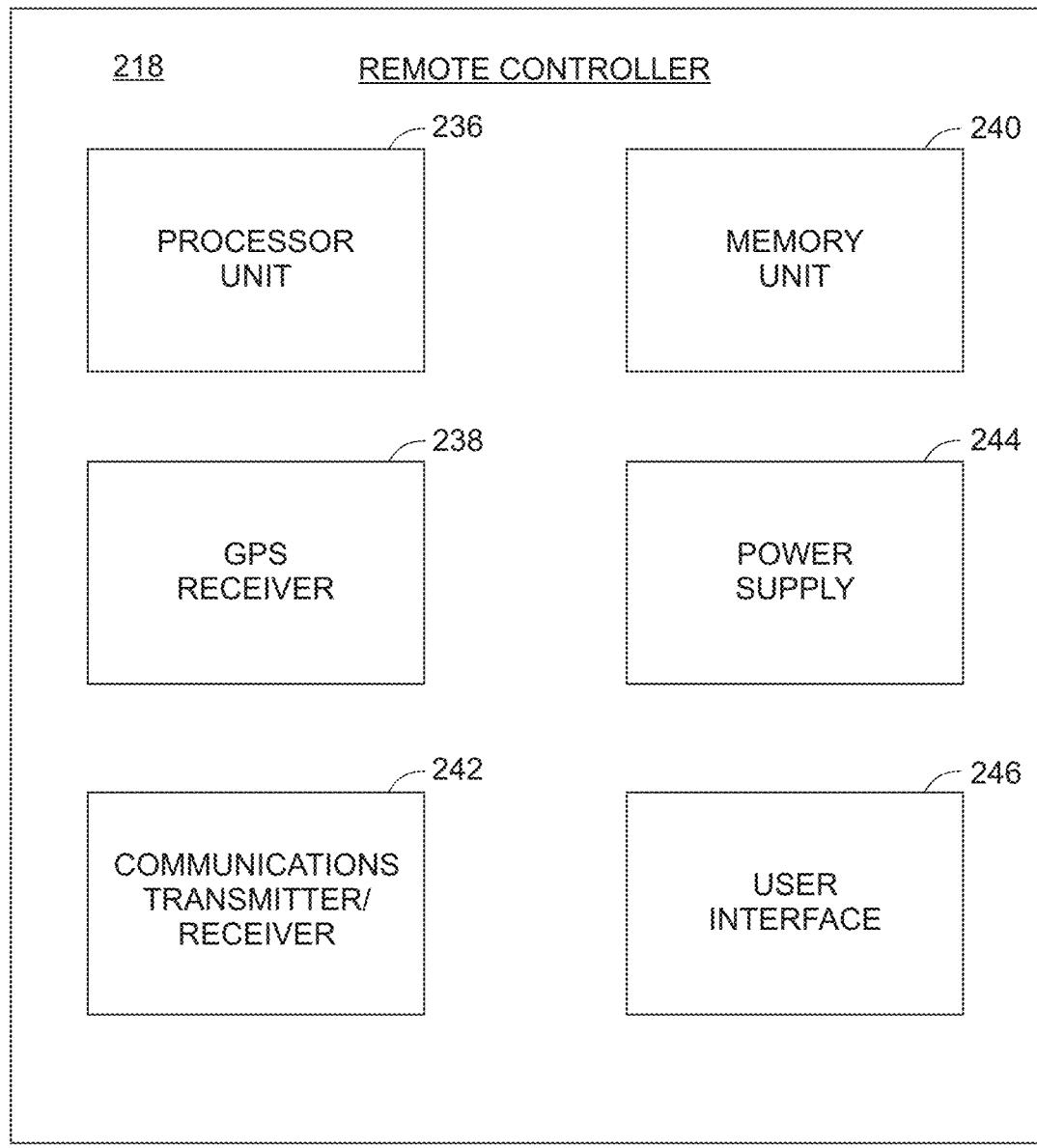
FIG. 9 is a detailed block diagram of an exemplary embodiment of a base controller, which may be one of the components of the operational control system.
Figure 10:
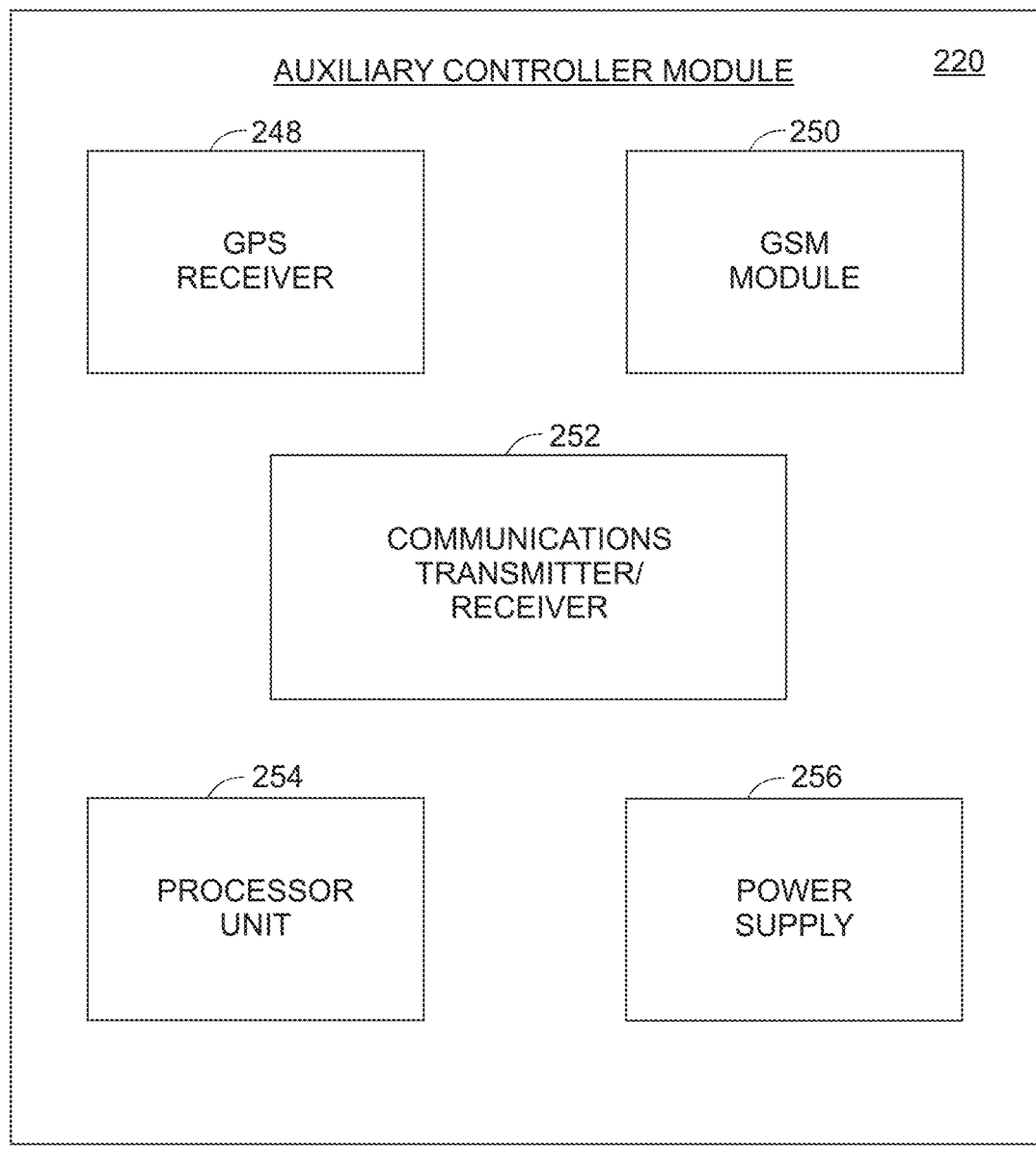
FIG. 10 is a detailed block diagram of an exemplary embodiment of an auxiliary controller module in accordance with aspects of the present invention, which may be one of the components of the operational control system.

Referring initially to FIGS. 7-10, and particularly to FIG. 7, the control system 214 of the present invention generally includes a remote unit in the form of an onboard primary controller 216 that may incorporate the components shown in FIG. 8, a remote controller 218 that may incorporate the components shown in FIG. 9, and an auxiliary controller module 220 that may incorporate the components shown in FIG. 10.

Referring now particularly to FIG. 8, there is illustrated the onboard primary controller 216 of the control system 214. The onboard primary controller 216 may be supported on, or otherwise integrated with, the device being remotely controlled (e.g., a vehicle, a vessel, a machine, equipment, an industrial system, etc.). The onboard primary controller 216 may include a control computer 222, a communications module 224, and a power supply 226. In some implementations where the thing being controlled is mobile (e.g., a vehicle/vessel, mobile/robotic equipment, etc.) communications module 224 may include, for example, a global positioning system (GPS) receiver 232 for determining coordinates of its location, and a communications transmitter/receiver 234 utilizing a predetermined first mode of communication for communicating with the remote controller 218. The onboard primary controller 216 may be adapted to control operations of, for example, devices 230a (e.g., a vehicle camera), systems 230b (e.g., an industrial system), networks 230c (e.g., computer networks, electrical networks, etc.), and controls 230d (e.g., vehicle controls, machine controls, industrial system controls, etc.).

Referring now particularly to FIG. 9, there is illustrated the remote controller 218 of the control system 214. The remote controller 218 may be portable and typically adapted to be held by, or in the possession, of an authorized operator/user of the control system 214. The remote controller 218 may have a processor unit 236, a global positioning system (GPS) receiver 238 for determining coordinates of the remote controller, a memory unit 240 connected to the processor unit 236, a communications transmitter/receiver 242 utilizing the predetermined first mode of communication for communicating with the onboard primary controller 216, a power supply 244, and a user interface 246. Depending upon the particular implementation, or application, of the invention, the remote controller 218 may be an RF transceiver, a smart device (e.g., a smart phone, a smart tablet, etc.), a laptop computer, or any other computer capable of wirelessly communicating with the auxiliary controller module 220 (and, preferably, the onboard primary controller 216) of the control system 214. Where the remote controller is a smart device, such as a conventional cell phone, the smart device may employ the smart device's SMS messaging feature. Alternatively, the smart device may carry a dedicated software application configured to communicate a coded message, following appropriate authentication, at the touch of a button. Furthermore, the remote controller could be a conventional landline phone from which the authorized operator could call into the GSM modem of the auxiliary controller module 220, and subsequently input/communicate a coded message to disconnect/disable the onboard primary controller 216 and, in its place, commence operation of the auxiliary controller module. In at least some implementations, the predetermined first mode of communication used by the onboard primary controller 216 and the remote controller 218 to communicate with each other (i.e., to enable the remote controller to provide instructions to the onboard primary controller to access, control and/or operate the remotely controlled device 230) may be, for example, RF signals, Bluetooth signals, cellular signals, etc.

Referring now particularly to FIG. 10, there is illustrated the auxiliary controller module 220 of the control system 214. The auxiliary controller module 220 may include a GPS receiver 248 for determining coordinates of the location of the auxiliary controller module, a global system for communications (GSM) module 250, a communications transmitter/receiver 252, a processor unit 254, and a power supply 256 for enabling operation of the aforementioned communications transmitter/receiver, GPS receiver, and GSM module. Preferably, the power supply 256 is capable of providing power to the aforementioned equipment when the primary power supply 226 to the onboard primary controller 216 is lost. As will be apparent to those skilled in the art, incorporating a power supply 256 into the auxiliary controller module 220 is optional. In some implementations, depending upon the redundancy required, it may not be necessary for the auxiliary controller module to carry its own power supply. The auxiliary controller module 220 may be directly integrated into onboard primary controller 216 or, alternatively, may be separately retrofitted thereon. Preferably, the auxiliary controller module 220 operates in accordance with GSM standards. Significantly, the auxiliary controller module 220 does not communicate with the remote controller 218 using the same mode of communication signals used by the onboard primary controller 216. Instead, the auxiliary controller module 220 communicates with the remote controller 218 using a predetermined, alternate, second mode of communication signals to receive instructions (e.g., cellular signals such as coded short message service (SMS) messaging, 3G/4G/5G/LTE systems, etc.) from the remote controller.

In at least some implementations, where the remote controller 218 is a portable cellular phone, the remote controller, via its own GSM module, using a subscriber identity module (SIM) card and employing SMS, may communicate with and send a text message in the form of a predetermined specific code (e.g., an alphanumeric code) to the GSM module 250 of the auxiliary controller module 220. The auxiliary controller module 220 may remain dormant until the authentication code and specific code, known only by the operator of the remote controller 218 and by the auxiliary controller module 220, is communicated by the remote controller to the auxiliary controller module. In the event the remote controller 218 is unable to communicate with the onboard primary controller 216 via the first mode of communication, the auxiliary controller module 220 may be activated by receipt of the activation code and the specific code via the second mode of communication. Accordingly, the auxiliary controller module 220 functions as a backup and disconnects, disables or otherwise take over communication with the control system, from the onboard primary controller 216, in response to receipt of the activation and specific codes.

In U.S. Pat. No. 11,092,957, the present applicant described the present invention primarily with respect to a Navigation Control System for unmanned aerial vehicles (UAVs); particularly, a drone. However, the invention has a variety of applications and can be implemented in various forms. For example, the invention may be implemented into any type of vehicle where it may be beneficial to provide a mechanism for remotely overriding a primary means of communicating with a control system of the vehicle. As used herein, the term "vehicle" may denote land vehicles, water vehicles (alternately referred to herein as "vessels"), and aerial vehicles (both manned and unmanned). Moreover, water vehicles, or vessels, may include both submersible and non-submersible vessels. As described in further detail herein, the invention also has a variety of non-vehicle applications, such as remotely controllable electronic devices, machines, industrial systems and the like.

Navigational Control System Implementation (U.S. Pat. No. 11,092,957)

Referring to FIG. 1, there is illustrated a prior art exemplary embodiment of a remotely controlled device, generally designated 100, in the form of an unmanned aerial vehicle (UAV) commonly referred to as a drone. The remotely controlled device 100 may be a different form of remotely controlled vehicle, such as an automobile. When in the form of a drone, the remotely controlled device 100 typically includes an airframe body 102 having a plurality of outward projecting rotor arms 104 and a plurality of downward projecting legs 106. The legs 106 support landing the remotely controlled device 100 in an upright horizontal orientation. At their outer ends, the rotor arms 104 mount motors 108 drivingly coupled to rotors 110 disposed above the motors and outer end of the rotor arms. The airframe body 102 also may support a camera 112.

Figure 2:
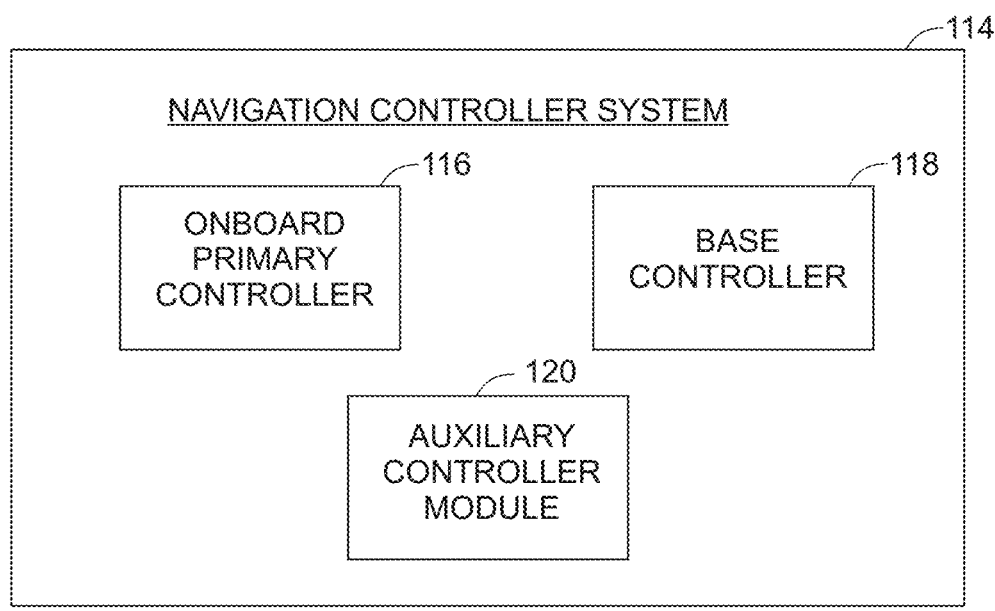
FIG. 2 is a general block diagram of an exemplary embodiment of a navigation controller system for retrieving control of a remotely controlled device in accordance with aspects of the present invention.

Referring now to FIG. 2, there is illustrated a navigation controller system 114, and the components thereof, for retrieving control of the remotely controlled device 100 in accordance with aspects of the present invention. The navigation controller system 114 generally includes a remote unit in the form of an onboard primary controller 116 that incorporates the components shown in FIG. 3, a base controller 118 that incorporates the components shown in FIG. 4, and an auxiliary controller module 120 that incorporates the components shown in FIG. 5.

Figure 3:
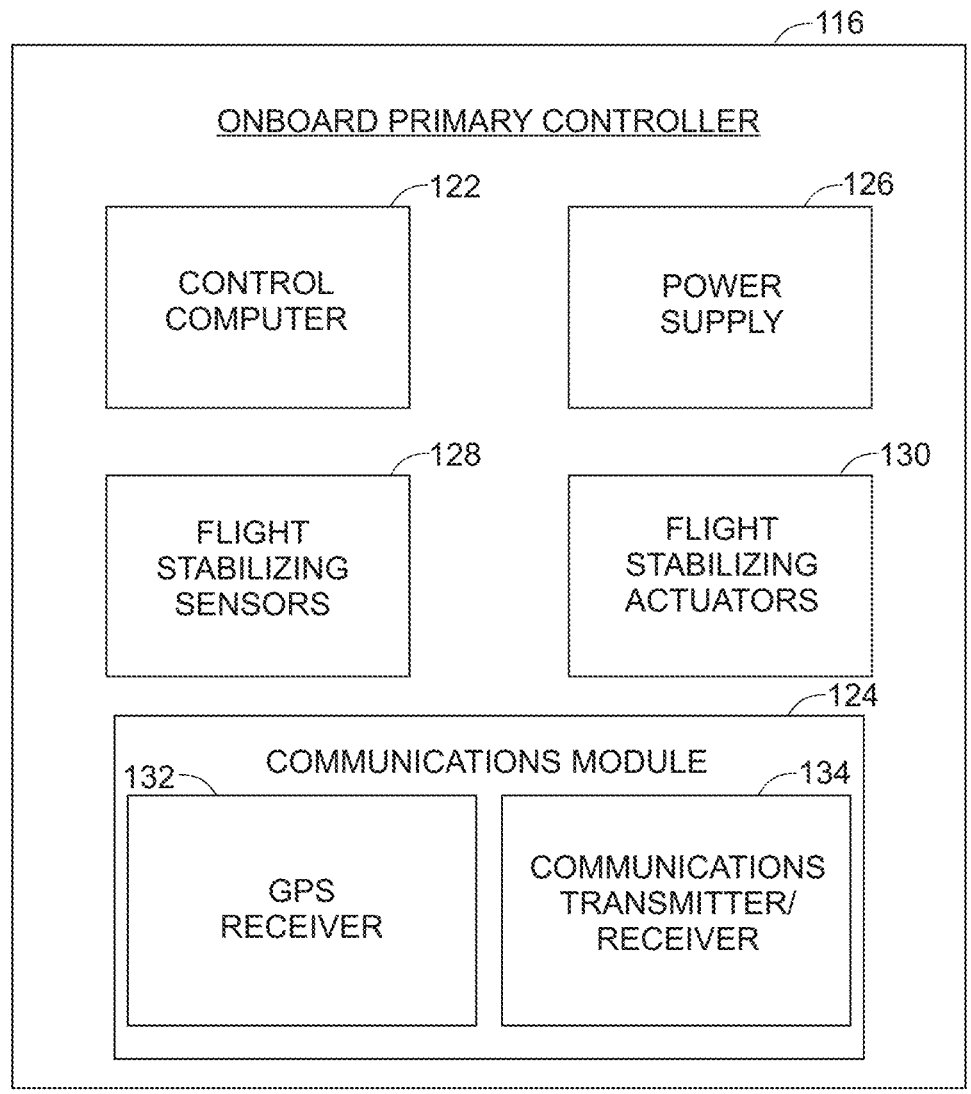
FIG. 3 is a detailed block diagram of an exemplary embodiment of an onboard primary controller, which may be one of the components of the navigation controller system.

Referring to FIG. 3, there is illustrated the onboard primary controller 116 of the navigation controller system 114. The onboard primary controller 116 is supported on the airframe body 102 of the remotely controlled device 100. The onboard primary controller 116 may include a control computer 122, a communications module 124, a power supply 126, and flight stabilizing sensors 128 and actuators 130. The communications module 124 may include a global positioning system (GPS) receiver 132 for determining coordinates of the location of the remotely controlled device and a communications receiver/transmitter 134 utilizing a predetermined first mode of communications for communicating with the base controller 118. The onboard primary controller 116 is adapted to control, for example, operation of the motors 108, and thus the rotors 110, and operation of the camera 112, in controlling the operation of the remotely controlled device 100.

Figure 4:
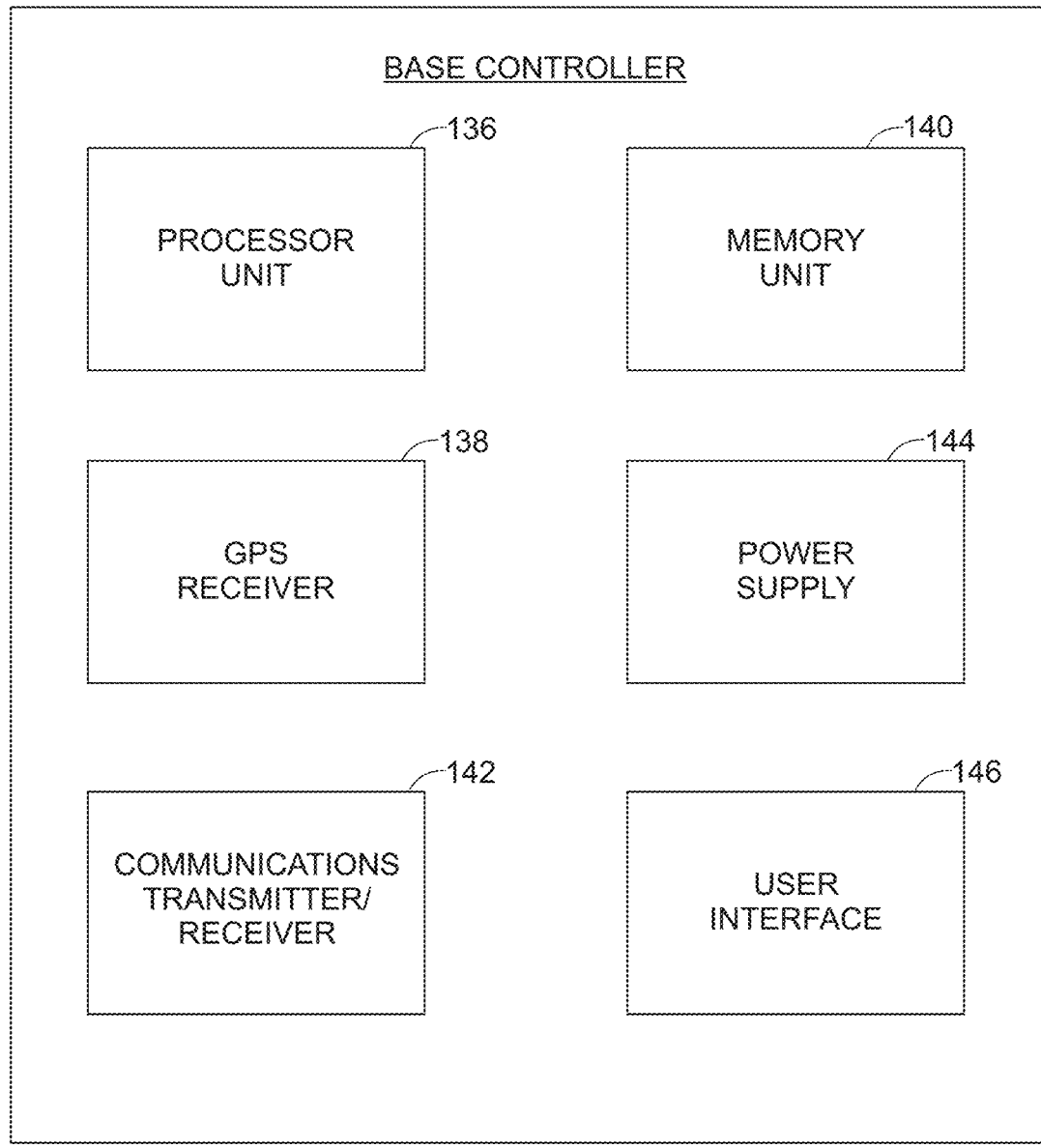
FIG. 4 is a detailed block diagram of an exemplary embodiment of a base controller, which may be one of the components of the navigation controller system.

Referring now to FIG. 4, there is illustrated the base controller 118 of the navigation controller system 114. The base controller 118 may be portable, typically adapted to be held by or in the possession of a user operator. The base controller 118 may have a processor unit 136, a global positioning system (GPS) receiver 138 for determining coordinates of the location of the base controller, a memory unit 140 connected to the processor unit 136, a communications transmitter/receiver 142 utilizing the predetermined first mode of communications for communicating with the onboard primary controller 116, a power supply 144, and a user interface 146. The base controller 118 may be a portable cellular phone, such as an iPhone® or a Blackberry® mobile device, a laptop computer or other portable electronic device. The predetermined first mode of communications the onboard primary controller 116 and base controller 118 use to communicate with each other may be, for example, RF signals, although alternatively may be Bluetooth, cellular etc., signals, to provide instructions by which to control and operate the remotely controlled device 100. The control operations performed by the onboard primary controller 116 and the base controller 118 are conventionally well-known, such as by way of example presented in the disclosure of U.S. Pat. No. 7,231,294. The disclosure of this patent is hereby incorporated herein by reference thereto.

Figure 5:
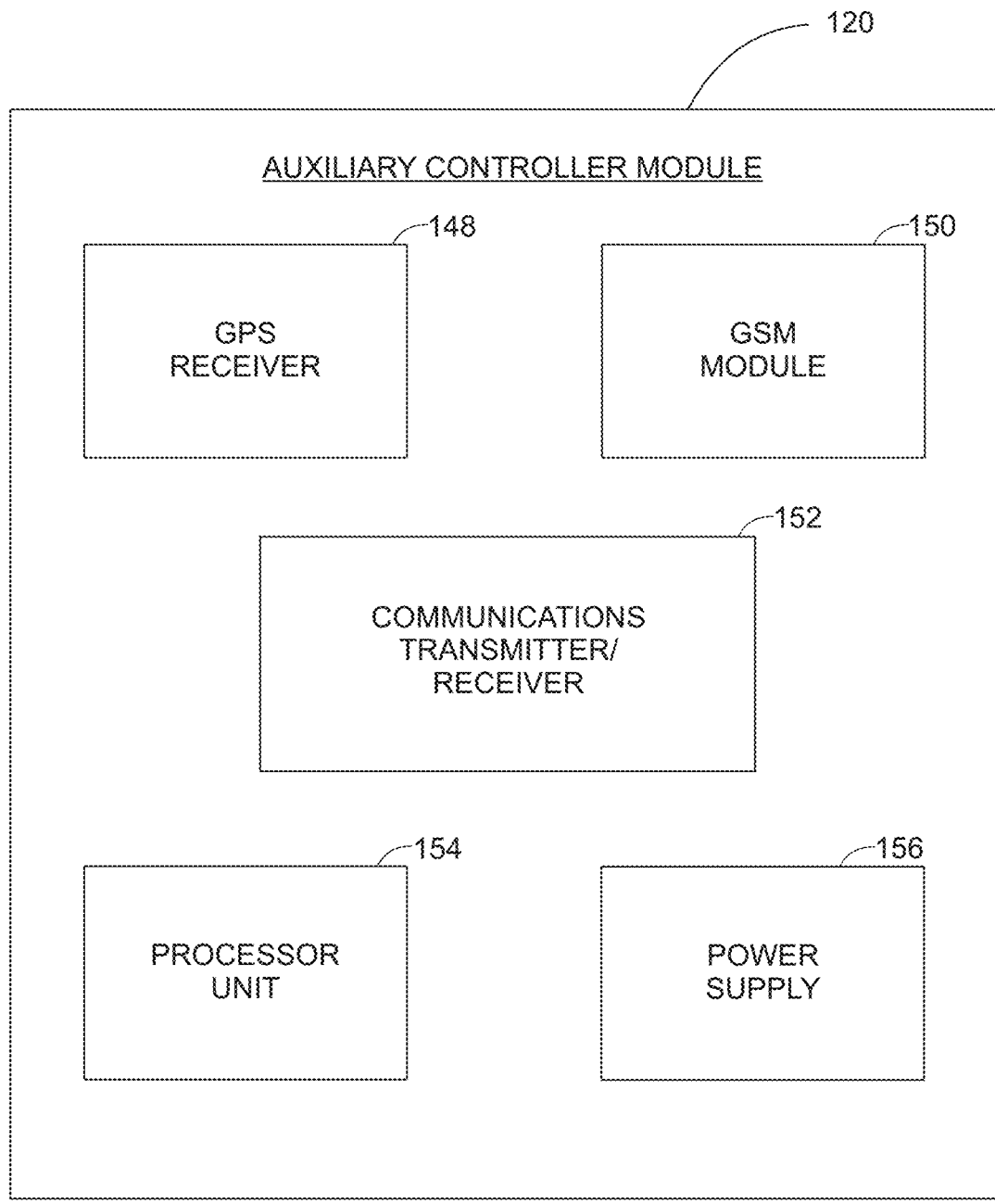
FIG. 5 is a detailed block diagram of an exemplary embodiment of an auxiliary controller module in accordance with aspects of the present invention, which may be one of the components of the navigation controller system.

Referring to FIG. 5, there is illustrated the auxiliary controller module 120 of the navigation controller system 114, in accordance with aspects of the present invention. The auxiliary controller module 120 may include a GPS receiver 148 for determining coordinates of the location of the auxiliary controller module, a global system for mobile communications (GSM) module 150, a communications transmitter/receiver 152, and a processor unit 154 and a power supply 156 for enabling operation of the communications transmitter/receiver, GPS receiver, and GSM module. As an added safety feature, the power supply 156 equipped on to auxiliary controller module 120 can provide power to the equipment even when the primary power supply 126 to the onboard primary controller 116 has dwindled. The auxiliary controller module 120 may be either separately retrofitted on the remotely controlled device 100 or integrated into its onboard primary controller 116. The auxiliary controller module 120 operates in accordance with GSM standards. It does not communicate with the base controller 118 using the same mode of communications signals as does the onboard primary controller 116, but by an alternate way in the form of a predetermined second mode of communications to send instructions, such cellular signals as coded short message service (SMS) messaging, or mobile phone call using 3G/4G./LTE systems, from the base controller. It is contemplated that the first and second modes of communications may be reversed such that, for example, communications between the onboard primary controller 116 and base controller 118 may be by cellular signal mode while communications between the base controller 118 and auxiliary controller module 120 may be by RF signal mode.

The portable cellular phone of the base controller 118, via its own GSM module, using a subscriber identity module (SIM) card and employing the short message service (SMS), may communicate with and send a text message embodying a predetermined specific (such as an alphanumeric) code to the GSM module 150 of the auxiliary controller module 120. The auxiliary controller module 120 remains dormant till the authentication code and specific code, known only by the operator of the base controller 118 and by the auxiliary controller module 120 on the remotely controlled device 100, is sent by the base controller to the auxiliary controller module. In the event the operator notices that the ability of the onboard primary controller 116 to communicate via RF signals, for example, with the base controller 118 fails for whatever reason, the auxiliary controller module 120 may be activated by receipt of the specific code communicated via non-RF signals from the operator of the base controller 118 to the auxiliary controller module. The authentication and specific code may be sent merely by a simple push of a button by the operator of the base controller. Thus, the auxiliary controller module 120 functions as a backup and disconnects, disables or otherwise takes over control in place of, the onboard primary controller 116 in response to receipt of the authentication and specific code. Even if the onboard primary controller 116 does not fail, such as when the operator realizes the remotely controlled device 100 is hijacked, lost or otherwise not responding to the primary RF controls, the auxiliary controller module 120 responds to receipt of the authentication and specific code by cutting off further control from the onboard primary controller and forces the remotely controlled device to comply with a new set of preprogrammed, on-the-fly instructions (or commands) in order to safely retrieve the remotely controlled device, or at the very least, send out the location of the device to the operator of the base controller 118.

Figure 6:
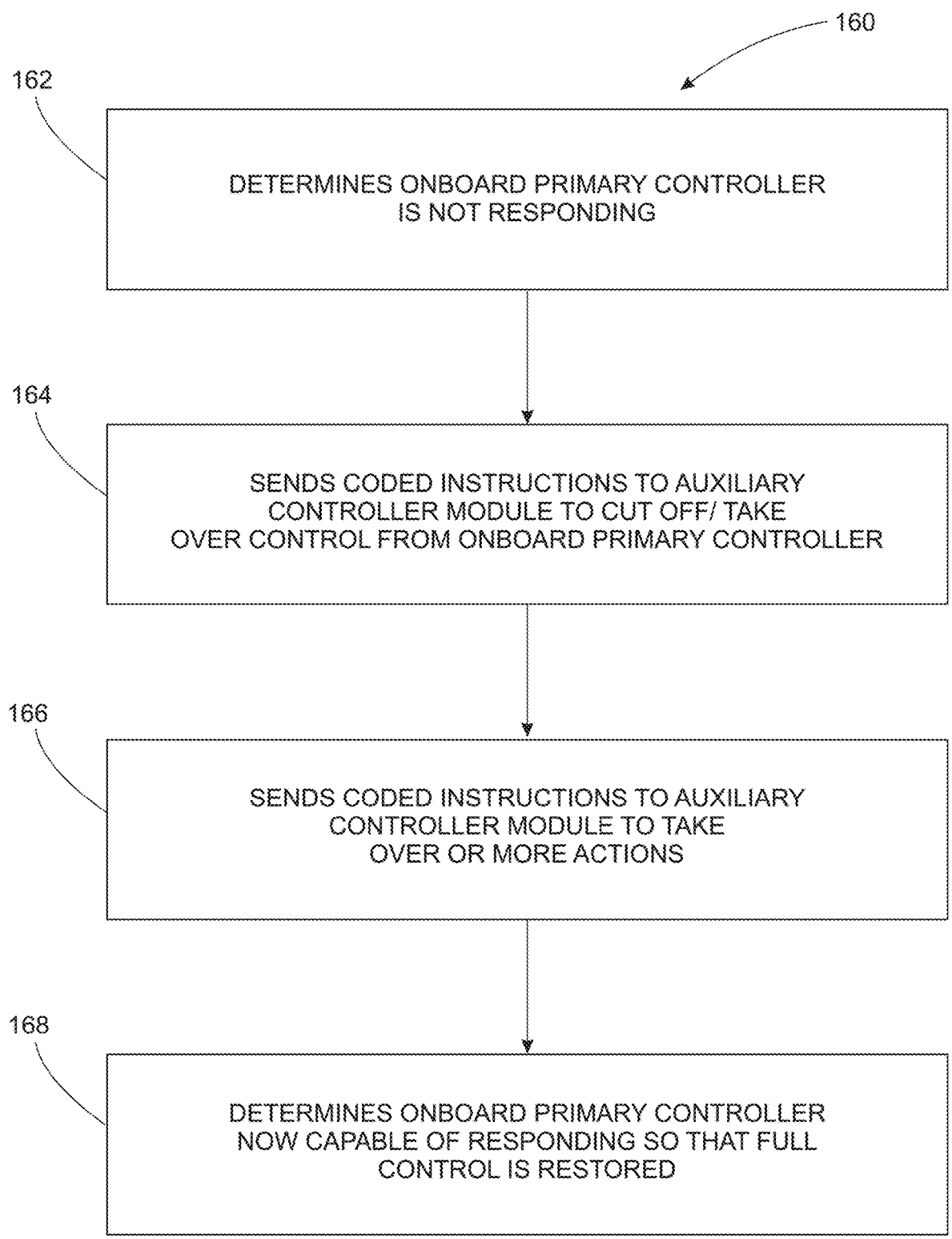
FIG. 6 is a flow diagram of an exemplary method for retrieving control of a remotely controlled device in accordance with aspects of the present invention.

Referring to FIG. 6, there is illustrated a flow diagram, generally designated by reference 160, of an exemplary embodiment of a method of retrieving control of a remotely controlled device 100 in accordance with aspects of the present invention. As per initial step 162, the operator of the base controller 118 determines that the onboard primary controller 116 is not responding. As per next step 164, the operator directs the base controller 118 to send alternate instructions (or commands) via coded SMS messages that includes an authentication code to the auxiliary controller module 120 on the remotely controlled device 100 to cut off the onboard primary controller 116 and disconnect, disable or otherwise take over control of the remotely controlled device from the onboard primary controller 116. As per next step 166, the instructions (or commands) via the coded SMS messages also indicate one or more of several possible alternative actions that the auxiliary controller module 120 is to take, as follows: (A1) the remotely controlled device 100 is to return to base; (A2) the remotely controlled device 100 is to go to a specific location specified in the coded SMS; (A3) the auxiliary controller module 120 is to send current coordinates of the remotely controlled device 100 to the base controller 118 (and/or to other specified recipients); (A4) the auxiliary controller module 120 is to track the path of the remotely controlled device 100 and send the path information to the base controller 118 (and/or to other specified recipients); (A5) the auxiliary controller module 120 is to provide the coordinates of the current location and/or location history of the remotely controlled device 100 to the base controller 118; and/or (A6) any other command from the base controller (such as in an extreme case, an instruction, or command, that the remotely controlled device 100 self-destruct). As per final step 168, the onboard primary controller 116 may be restored to full control of the remotely controlled device 100 should the operator determine that the onboard primary controller 116 is out of jamming range and now capable of responding and resuming such control. The auxiliary controller module 120 is not intended to be used to control the remotely controlled device 100 full-time; instead, it is specifically designed to be used as a failsafe device when normal control has failed, or the authorized operator has lost control of the remotely controlled device via the onboard primary controller 116.

The auxiliary controller module 120 may be implemented as a standalone device or an integrated device according to different shapes, sizes and styles desired by users. It is perceived that the dimensions may be as small within the range of about 2.5 cm-5 cm×2.5 cm-4 cm×1 cm. Regarding either standalone or integrated options, end users, either companies or individuals, who are currently or planning to use remotely controlled devices 100 may wish to protect their investment by being able to have an alternative means of communicating with their remotely controlled devices (e.g., a phone app). Also, law enforcement may also find use for the auxiliary controller module 120 to provide the failsafe option as it is illegal in almost all jurisdictions to jam or block cellular communications and bad actors are less likely to jam such cellular frequencies as it would jam their own communication devices. With regard to law enforcement, for example, DEA and DHS would greatly benefit while dealing with human traffickers and drug smugglers, who constantly try to defeat the law enforcement drones. For the same reason, police could employ this technology with their drones—where legally permitted. If the remotely controlled device 100 is stolen, or lost, the user who has deployed the auxiliary controller module 120, as heretofore described, may access it via SMS and receive a real-time location or set off a buzzer to alert local authorities. In another implementation, the contingency auxiliary controller module 120 may also be outfitted with an audio output component, such as an auditory device (e.g., a speaker), which can send out various noises like ones that mimic an eagle, or some other alpha predator sounds, to protect the remotely controlled device 100 against an attack by another bird of prey. For example, since 2016, French eagles have been trained to spot and take down non-military drones, from miles away.

As will be readily apparent to those skilled in the art, the system and method of the present invention may be adapted for use in connection with vehicles, such as conventional automobiles and trucks, which are not necessarily considered remotely controlled vehicles in the traditional sense of the term (i.e., vehicles that are not normally controlled remotely, but can be remotely accessed and controlled in a limited manner). For instance, most automobiles are not configured to be controlled remotely in the traditional sense; yet discrete onboard systems may be configured for remote access with respect to telematics services (i.e., vehicle systems combining GPS and cellular technologies with onboard electronics). Some examples include in-vehicle security, emergency services, hands-free calling, turn-by-turn navigation, and remote diagnostics. Furthermore, such onboard systems are being increasingly adapted to enable remote engine starting and shutdown, vehicle tracking, and related functions. Accordingly, such systems are becoming increasingly susceptible to undesirable outside interference, or hacking. Moreover, so-called autonomous vehicles, while operating substantially on their own with little or no ongoing control from a remote operator, are susceptible to having their control taken over remotely by a bad actor—which could have disastrous consequences. In that regard, the system and method of the present invention may be employed to provide an alternate or redundant system capable of counteracting hijacked control of such vehicle functionalities.

Vehicle Telematics System Implementation

In accordance with another exemplary implementation, the present invention may be integrated with a vehicle telematics system. Telematics is a disruptive automotive technology that utilizes internet technology (IT) and communication protocols to send, receive and store information pertaining to remote vehicles. The data is transmitted over a wireless network and an in-vehicle electronic device or smartphone may be employed for establishing remote connectivity. A conventional automotive telematics solution fundamentally has four building blocks: (1) a vehicle electronic control unit (ECU) network: (2) a telematics control unit (TCU); (3) an internet-of-things (IoT) cloud server; and (4) telematics applications.

Figure 11:
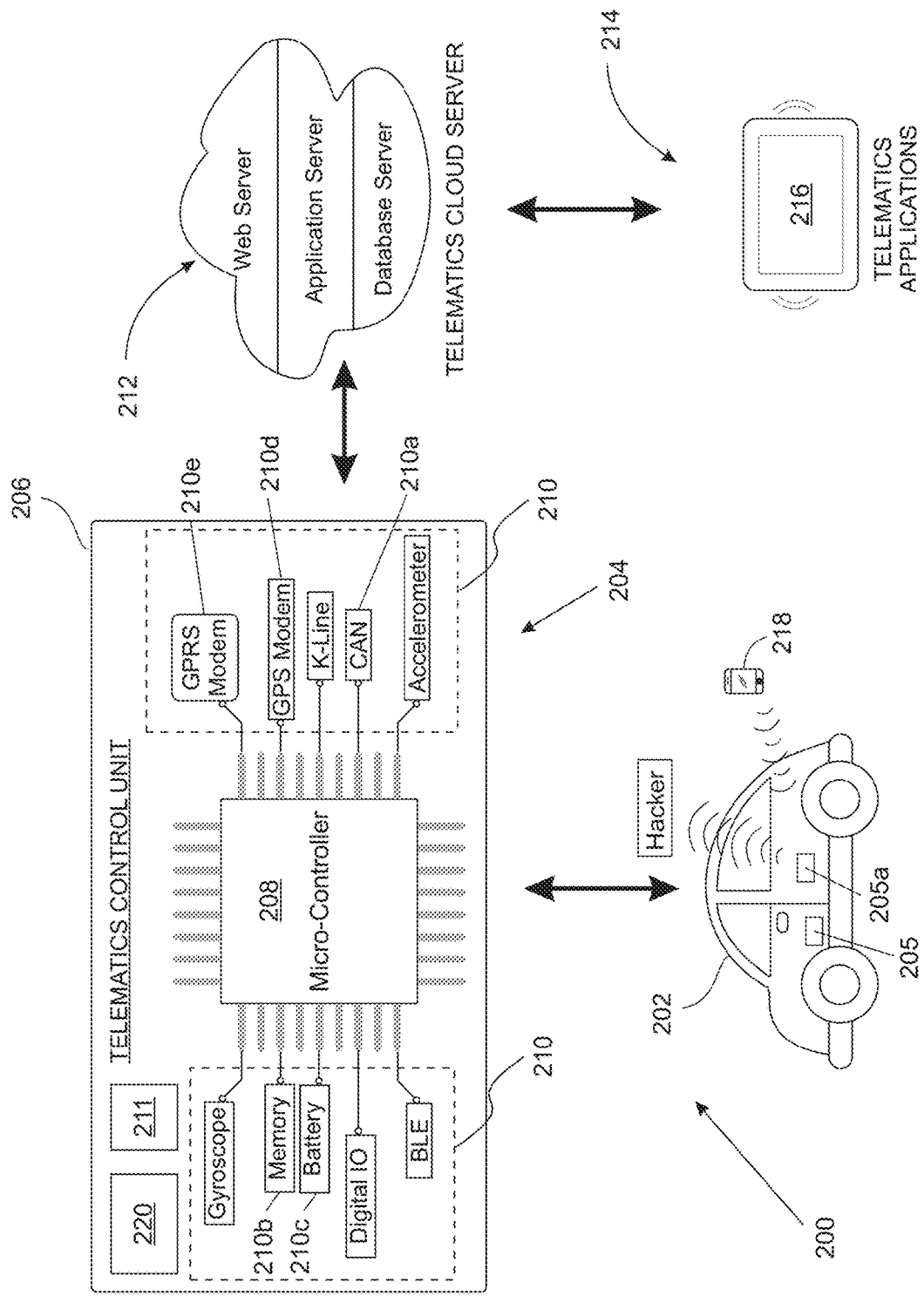
FIG. 11 is a detailed schematic diagram of an exemplary vehicle telematics system incorporating a control system in accordance with the present invention.

Referring now primarily to FIG. 11, an auxiliary controller module 220 (as previously described with respect to the navigational controller system embodiment of the invention) may be integrated with a telematics control unit (TCU) 206 on board a vehicle 202. Moreover, auxiliary controller module 220 may be integrated with a central processing unit (CPU), or micro-controller 208 of the TCU 206. Inside the vehicle 202, there is an interconnected network of automotive electronic control units (ECUs) 205, which assist the TCU 206 with collecting vehicle telemetry data such as engine data, vehicle speed, vehicle position, diagnostics information, etc. by interfacing with various sub-systems over data and control buses 210 in the vehicle. The TCU 206 is embedded on board the vehicle, and wirelessly connects the vehicle to cloud services 212 or to other vehicles via an onboard transceiver 205a over a cellular network. The TCU has communication interfaces with the vehicle's controller area network (CAN) bus 210a and the IoT cloud server. A CAN bus module (not shown) manages all communication with the vehicle ECUs 205 (i.e., the TCU exchanges information with the vehicle ECUs through the CAN bus 210a). It may also use K/Line bus 210e for specific functions such as theft alerts, remote locking of the vehicle, etc.

The telematics control unit (TCU) may incorporate various communication interfaces, which support multiple communication channels such as Wi-Fi, cellular, long-term evolution (LTE), and general packet radio service (GPRS) networks. The TCU collects the aforementioned vehicle data and transmits the information to the IoT cloud. Communication with the telematics cloud server 212 is established through the respective cellular, LTE, or GPRS network. This information is stored in the IoT cloud and can be accessed by connected mobile or web applications 216 in the IoT ecosystem. The TCU also manages the memory 210b and battery 210c of the telematics device. Additionally, it streamlines the data that is shared with the driver through the Human Machine Interface (HMI) device or vehicle dashboard.

The TCU hardware may also include a GPS modem 210d, a GPRS modem 210e, and a Bluetooth module 211. The GPS modem 210d may be a complete GPS receiver module which contains all function blocks ranging from antenna input to serial data output. The GPS receiver module obtains the vehicle's location information from satellites in the form of latitude and longitude. The microcontroller 208 processes this information and sends it, via GPS modem 210d, for example, to the vehicle driver's mobile phone 218. A GPRS module (not separately identified) may, in addition to tracking vehicle location, facilitate data connectivity and voice-based communication with remote devices. It may have any type of SIM (e.g., an ordinary SIM card, an eSIM, a nano SIM, or a plastic SIM card along with the GPRS modem 210e). The Bluetooth module 211 enables connectivity to nearby devices like vehicle user's mobile phone 218.

In the event that a vehicle user loses connectivity with TCU 206 (i.e., with onboard transceiver 205a) via the corresponding Bluetooth connection, an alternative communication channel may be established via auxiliary controller module 220, in the same manner as previously described vis-h-vis auxiliary controller module 120 of the navigational controller system implementation. In this case the telematics control unit (TCU) 206 functions as the "onboard primary controller" (FIG. 2; Reference No. 116) and the vehicle user smartphone 218 functions as the "base controller" (FIG. 2; Reference No. 118). In this case, the predetermined first mode of communication between TCU 206 (i.e., transceiver 205a) and vehicle owner/user smartphone 218 is preferably Bluetooth signals (i.e., via Bluetooth module 211). The auxiliary controller module 220 may be either separately retrofitted on the vehicle 202 or integrated into its onboard TCU 206. The auxiliary controller module 220 may operate in accordance with GSM standards. It does not communicate with the smartphone 218 using the same mode of communications signals (e.g., Bluetooth) as does the TCU 206 (i.e., via Bluetooth module 211). Instead, the auxiliary controller module 220 may communicate with smartphone 218 using an alternate communication means in the form of a predetermined second mode of communications to send instructions, such as cellular signals, coded short message service (SMS) messaging, or mobile phone call using 3G/4G./LTE systems, from the smartphone. As shown in FIG. 11, when a hacker accesses the TCU 206 via transceiver 205a using the first mode of communication, the vehicle user/owner can send a coded message (as indicated) to disconnect/disable the transceiver, thereby terminating hacker communication with, and control of, the onboard TCU 206.

As previously described herein with respect to the navigational controller system implementation, the smartphone 218, via its own GSM module, using a subscriber identity module (SIM) card and employing the short message service (SMS), may communicate with and send a text message embodying a predetermined specific (such as an alphanumeric) code to the GSM module 250 of the auxiliary controller module 220. The auxiliary controller module 220 remains dormant until the authentication code and specific code, known only by the operator of the smartphone 218 and by the auxiliary controller module 220 on the TCU 206, is sent by the smartphone to the auxiliary controller module. In the event the vehicle operator notices that the ability of the TCU 206 to communicate via Bluetooth, for example, with the smartphone 218 fails for whatever reason, the auxiliary controller module 220 may be activated by receipt of the specific code communicated via non-RF signals from the vehicle operator smartphone to the auxiliary controller module. The authentication and specific code may be easily transmitted via the vehicle operator smartphone.

As indicated in FIG. 11, the telematics control unit (TCU) 206 collects data from within the vehicle 202 and relays it back to the IoT cloud 212 through the particular wireless communication network. This information is then pushed to the telematics applications/back-office systems (e.g., Web Server, Application Server, and Database Server) where it is analyzed, and business intelligence decisions are made. Likewise, the back-end applications send data to the TCU 206 from the IoT cloud through the same communication channel. Accordingly, an auxiliary controller module 220 could be employed to function as an emergency alternate communication channel between the TCU 206 and telematics applications/back-office systems 216, in much the same manner as previously described with respect to communications between the TCU and the vehicle operator smartphone 218.

Autonomous (and Semi-Autonomous) Vehicle System Implementation

Figure 12:
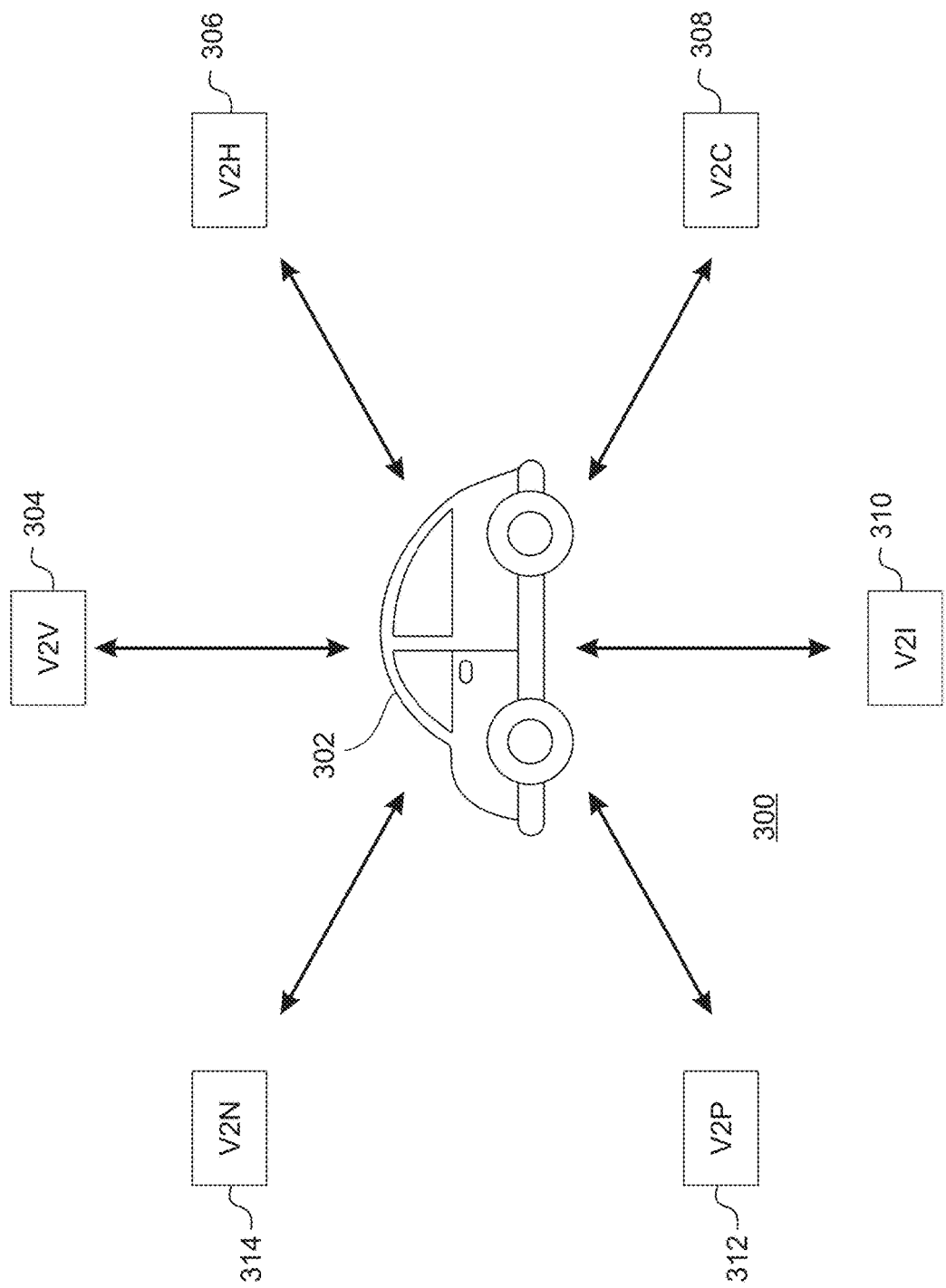
FIG. 12 is a schematic diagram illustrating a Vehicle to Everything (V2X) vehicular communication system associated with an autonomous vehicle navigation system.
Figure 13:
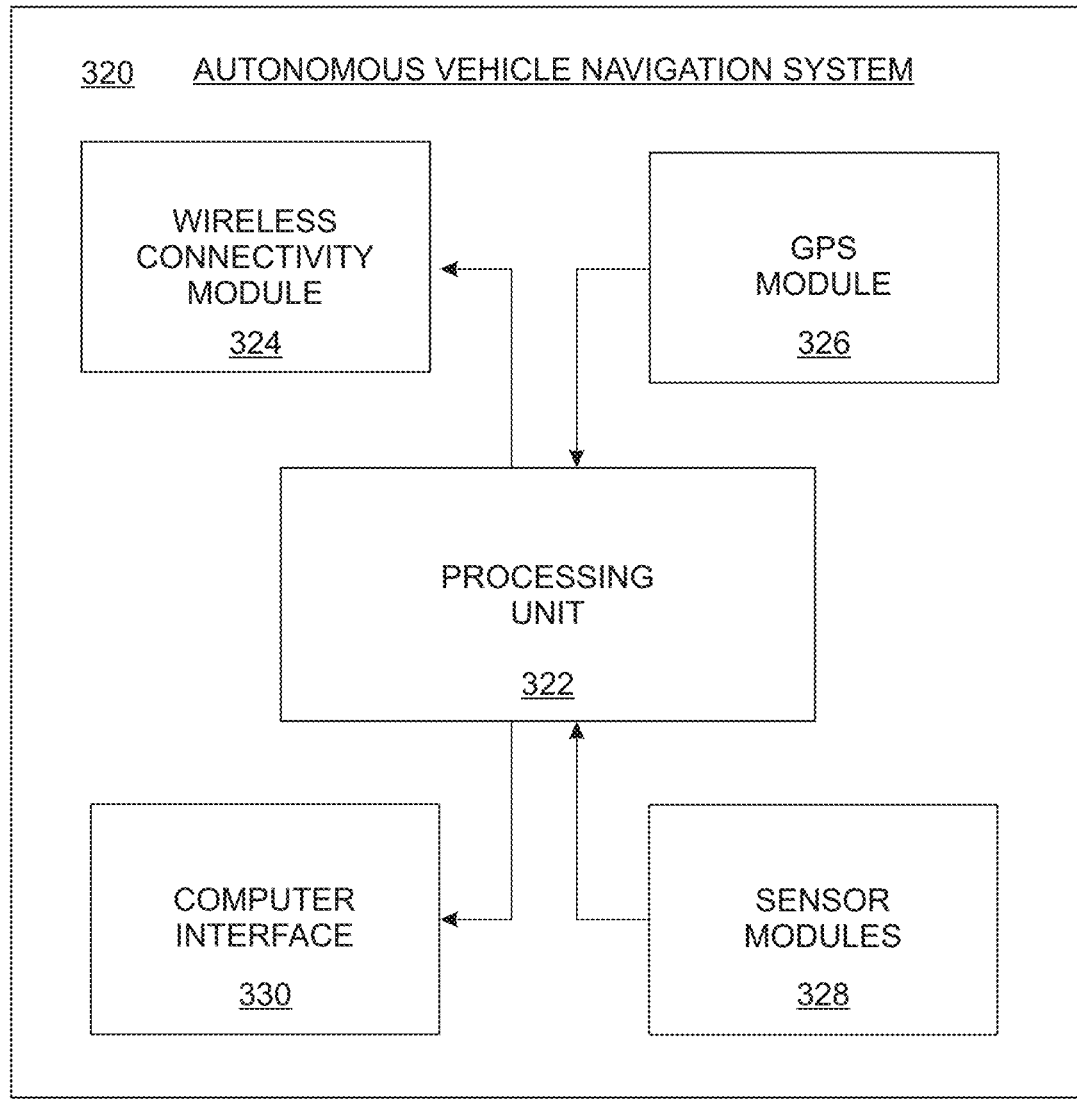
FIG. 13 is a block diagram of an autonomous vehicle navigation system with which the control system of the present invention may be integrated.

Referring now to FIGS. 12-13, in accordance with another exemplary implementation, the present invention may be integrated with an autonomous (or semi-autonomous) vehicle 302. Autonomous, or self-driving, vehicles are potential targets of cybercriminals who may attempt to steal financial data from drivers or launch high-level terrorist attacks by turning vehicles into weapons due to their high level of connectivity. Artificial Intelligence (AI) systems make autonomous vehicles vulnerable. Besides unintentional threats like sudden malfunctions in the A1 systems, there are intentional attacks that aim to specifically harm the safety-critical functions of the A1 systems. There are multiple ways to gain control of self-driving vehicles, including: remote access via the Internet; remote access via Bluetooth; inserting a backdoor into the vehicle via the manufacturer (i.e., supply chain); planting a specialized device into the vehicle; and tampering with the sensory system of the vehicle.

An autonomous vehicle control system generally includes the following subsystems: (1) a perception system; (2) a navigation system; (3) decision systems; and (4) an autonomous control system. Autonomous vehicles collect data, via the perception system, with the help of various vehicle sensors such as: sensors for blind-spot monitoring and forward collision warning; cameras; Light Detection and Ranging (LIDAR); and radar. The perception system is crucial for the smooth and stable operation of the vehicle 302. It may be used to detect vehicles, humans and other objects (i.e., the physical environment) around the vehicle using the aforementioned perception sensors. The navigation system—generally based upon GPS—may use real time geographical data received from several GPS satellites to calculate latitude, longitude, speed and course to help navigate the vehicle 302. The decision system, or decision-making system, in autonomous vehicles generally comprises the transition of the environmental perception system and navigation (motion planning) system. In general, the inputs of the decision system are environmental clues and status of the vehicle, such as, for example, surrounding environmental information, status of vehicle (i.e., location and motion information), and high-definition mapping used as an auxiliary means of the environmental perception system to enhance the perception accuracy. The outputs are a series of strategies including high-level behaviors (e.g., merging, overtaking, lane keeping and lane changing) and low-level commands (e.g., longitude velocity, acceleration and angular velocity, and acceleration) fed into the navigation system. The autonomous control system (ACS) generally comprises software tools designed using model-based engineering, artificial intelligence, machine learning, and data acquisition to enable self-governance of vehicle control functions with little or no human intervention for extended periods of time in an uncertain or contested environment.

Referring now particularly to FIG. 12, the automotive industry is working toward achieving so-called "vehicle-to-everything," or V2X, capabilities. There are six key connectivity requirements necessary to reach this goal. Autonomous vehicle V2X communications may include: Vehicle-to-Vehicle (V2V) communications 304, which allows autonomous vehicles to communicate with one another; Vehicle-to-Home (V2H) communications 306, which allows so-called "smart homes" to send and receive information directly to the vehicle 302; Vehicle-to-Cloud (V2C) communications 308, which provides direct access to cloud networks using secure TCP/IP connections; Vehicle-to-Infrastructure (V2I) communications 310, which allows the vehicle 302 to receive information from buildings, bridges, roads, traffic lights, etc.; Vehicle-to-Pedestrian (V2P) communications 312, which makes use of pedestrian detection systems that can work with a vehicle's advanced driver assistance systems (ADAS); and Vehicle-to-Network (V2N) communications 314, which is the mobile connection from the vehicle 302 to a carrier's cellular network. V2X communications uses a combination of sensor technology and radio-based communication (e.g., RF, cellular, satellite, etc.). The various V2X communications make autonomous vehicles highly susceptible to being hacked by bad actors. By way of example, a vehicle's navigation system is particularly vulnerable to such hacking.

Referring now particularly to FIG. 13, an autonomous vehicle navigation system 320 generally includes: a central processing unit 322; a wireless connectivity module 324; a GPS module 326; sensor modules 328; and a computer interface 330. The wireless connectivity module is a functional module that integrates chip, memory, power amplifier and other devices into one circuit board and provides standard interfaces. It is an underlying hardware installed to connect vehicles with telematics and internet for transmitting and collecting data. It enables the above V2X direct communication and data exchange between the vehicle and other vehicles, the cloud, infrastructure, etc. The GPS module 326 uses real time geographical data received from GPS satellites, etc. as previously described. Processing unit 322 generally represents a central processing unit (CPU) but may also include a graphics processing unit (GPU), or graphics card. As shown, processing unit 322 receives inputs from the GPS module 326 as well as the various sensor modules 328. Processing unit data output may be communicated to a computer interface 330 and the wireless connectivity module 324.

Accordingly, the system and method of the present invention may be easily deployed in an autonomous vehicle in much the same manner as described above with respect to vehicle telematics technology, by integrating an auxiliary controller module 220 into the autonomous vehicle navigation/control system 320 in the same manner as previously described vis-h-vis the telematics system implementation. In this manner, a remote controller 218 (e.g., a smartphone carried by a vehicle operator) could be used to terminate unauthorized communication with the autonomous vehicle navigation/control system by a bad actor who has gained access thereto.

Vessels

With regard to vessels incorporating autonomous technologies, telematics and the like, the present invention may be integrated in much the same manner as previously described with respect to vehicles. The present system and method may be adapted for use with ships and other watercraft (both submersible and non-submersible), whether autonomous or semi-autonomous, that are likewise susceptible to the undesirable exterior interference by bad actors. The device components of the present invention employ relatively simplistic mechanisms, which would not require much space and, therefore, could be secreted just about anywhere. The more discreet the system component locations, the greater the likelihood of their successful integration and deployment. For instance, an implementation of the system utilizing satellite as a method of communication would incorporate connection to a satellite receiver somewhere on the vessel/craft—possibly, separately integrated (e.g., separately wired) with existing satellite dishes on the vessel/craft. Moreover, the present device may be connected to a traditional RF receiver. Where the inventive device is in communication with a satellite receiver, the aforementioned "coded" signals could be transmitted from just about any remote location.

With respect to submersible vehicles, or vessels, conventional manned submarine communications are generally carried out while submerged using Extremely Low Frequency (ELF) or Very Low Frequency (VLF) radio waves (i.e., within a frequency range of about 300 Hz to 30 kHz) capable of penetrating water at those depths. Conventional submarine communications are extremely low bandwidth, one-way systems that often require towed antennas or buoys. Active remote control of conventional manned submarines is generally precluded as a result of the limited one-way communication. However, in some instances the present invention may be implemented vis-h-vis unmanned submersible vehicles.

Unmanned submersible vehicles fall into a number of different subclasses. The simplest are those submersibles that are towed behind a ship. They act as platforms for various sensor suites attached to the vehicle frame. Towed submersibles are generally not susceptible to the issues addressed by the present invention. A second type of a submersible system called a Remotely Operated Vehicle (ROV) is a tethered vehicle. The tether supplies power and communication (i.e., via optical fiber for a broadband low-latency communication link) to the ROV and is controlled directly by a remote operator. Again, ROVs are generally not susceptible to the issues addressed by the present invention. However, in some cases, a third type of unmanned submersible—an Unmanned Untethered Vehicle (UUV)—may benefit from the present invention.

An unmanned untethered vehicle (UUV) contains its own onboard power but is controlled by a remote operator via some type of a wireless communications link. An Automated Underwater Vehicle (AUV) is a type of UUV containing its own power and controlling itself while accomplishing a pre-defined task. Unlike a conventional (non-autonomous) UUVs, an AUV may not require communication during its mission whereas the UUV requires some level of communication for it to complete its assigned mission. Nowadays, the increasing availability of commercial off-the-shelf underwater acoustic and non-acoustic (e.g., optical and electromagnetic) modems that can be employed for both short-range broadband and long-range low-rate communication, the increasing level of autonomy of underwater vehicles, and the refinement of their underwater navigation systems are paving the way for several new applications, such as data muling from underwater sensor networks and the transmission of real-time video streams underwater. The present invention could be beneficial for use with such underwater vehicles. For example, it would be beneficial to provide a remote operator of a UUV with a means of reestablishing communication with the UUV, via a secondary communication means where a primary means of communication has been lost or is otherwise compromised. Furthermore, it would be beneficial to provide a way for an operator of an AUV to establish wireless communication with an (automated) onboard control system, for example, to signal the AUV to modify its preprogrammed instructions (e.g., where the automated control system has been compromised or is not functioning properly). With regard to UUVs, an auxiliary controller module may be integrated with the onboard UUV control system to enable a remote authorized operator, via a base controller, to establish communication with the UUV via a non-primary means of wireless communication, where remote control of the UUV—or one or more UUV subsystems—has been lost or compromised. With regard to AUVs, an auxiliary controller module may be integrated with the onboard AUV control system to enable a remote authorized operator, via a base controller, to establish communication with the AUV via a non-primary means of wireless communication, where automated control of the AUV—or one or more AUV subsystems—has been lost or compromised.

Furthermore, the present system and method may be adapted for use with completely non-autonomous ships (e.g., oil tankers), which are susceptible to having their operations taken over via piracy, wherein a crew member of the pirated ship is forced to captain/drive the ship. In accordance one scenario, the crew member could employ the inventive system to disable ship controls using specific commands, wherein the controls can only be re-enabled remotely via coded signals—through the same frequency or an alternate frequency. In another scenario where the ship is not disabled, but the owner of the ship becomes aware of the loss of communication/control of the ship, the ship owner could employ coded messaging on an alternate frequency/method to determine the ship's location in order to direct rescue efforts, issue remote commands to shut off the ship's engine, electrical power, etc. The present system may further incorporate a multi-authentication methodology for initiating the coded message. For instance, initiating a coded message could involve a countersigning method, wherein two or more parties (e.g., an insurance company and ship owner) are required to each provide individual portions of the full code. Alternatively, for control via a short-range communication method, the present invention could potentially be used by rescue personnel to trigger an event (e.g., engine shutdown, power cutoff, etc.) just prior to boarding and retaking control of the ship. Again, as a result of the simplicity of the system/device components, the system is easily adaptable for installation almost anywhere on the ship. In a most simple implementation, the device can be integrated in-line with one of the power wires connecting power to the control center on the ship's bridge. Upon receiving a coded message, the system would simply shut off the switch and thereby ceasing power—which could then be regained via a coded message. In a more sophisticated implementation, the coded message may be used to trigger a master override that would lock out the bridge controls via software, while still maintaining remote control via coded messaging.

Industrial Plants

The present system and method may be easily adapted for use in connection with industrial plants susceptible to outside interference in the form of cyberattacks. For instance, the system may employ a software-based control mechanism. For instance, where a water treatment plant computer system has been breached and gates opened to mix treated and untreated water supplies, a coded message could be remotely communicated to disrupt the function by either software or even hardware switches. In this instance, a multi-authentication scheme would be appropriate. To wit, two or more individuals may be required to input respective secret codes to activate the system/device of the present invention, wherein the device could be configured/adapted to maintain root access and lock out all terminals, if need be, or even issue commands to cut off power to appropriate discrete components, thereby minimizing any damage resulting from the malicious cyberattack. Depending upon the voltage of the component intended to be cut off by the inventive device, a variety of different types of electromechanical relays may be employed.

Industrial Control System (ICS) Implementation

Figure 14:
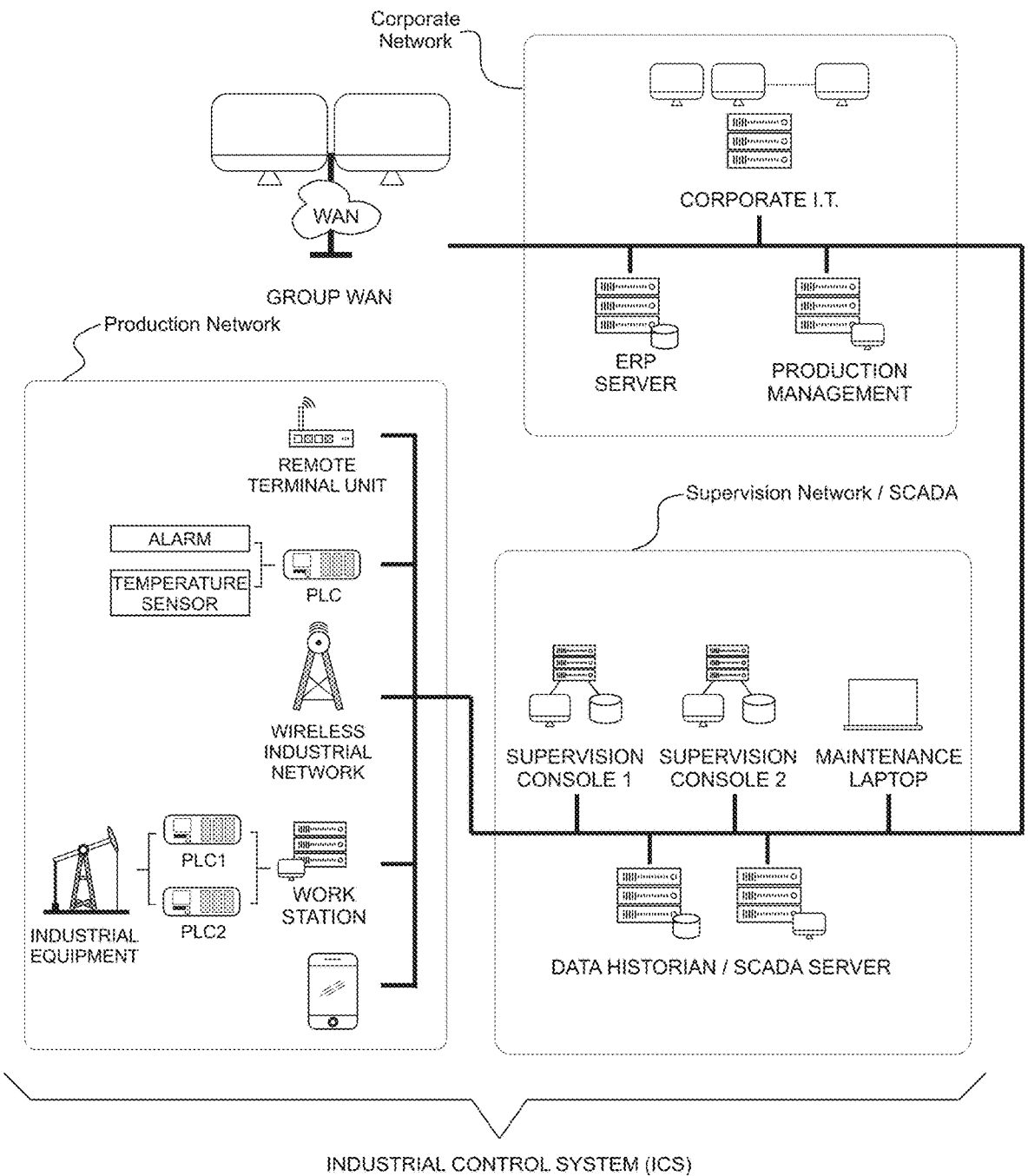
FIG. 14 is a schematic diagram of an industrial control system (ICS) with which the control system of the present invention may be integrated.

Referring now primarily to FIG. 14, the present invention may be implemented into any type of an industrial control system (ICS) where it may be beneficial to provide a mechanism for remotely overriding a primary means of communication with the system. As used herein, the term "industrial control system" is meant to denote any of a broad class of automation systems used to provide control and monitoring functionality in manufacturing and industrial facilities. In other words, industrial control system (ICS) is a collective term used to describe different types of control systems and associated instrumentation, which include the devices, systems, networks, and controls used to operate and/or automate industrial processes. Depending on the industry, each ICS functions differently and is built to electronically manage tasks efficiently. The devices and protocols used in an ICS are used in nearly every industrial sector and critical infrastructure such as the manufacturing, transportation, energy, and water treatment industries. The most common types of ICSs are Supervisory Control and Data Acquisition (SCADA) systems, and Distributed Control Systems (DCS). Implementing an ICS environment may be a hybrid of DCS and SCADA wherein attributes from both systems are incorporated.

Supervisory Control and Data Acquisition (SCADA) systems cannot provide full control. Instead, its capabilities are focused on providing control at the supervisory level. SCADA systems are composed of devices; generally, Programmable Logic Controllers (PLCs) or other commercial hardware modules that are distributed in various locations.

A PLC is a type of hardware that is used in both DCS and SCADA systems as a control component of an overall system. It also provides local management of processes being run through feedback control devices such as sensors and actuators. As shown in FIG. 14, PLC1 could, for example, compare the measured flow to the setpoint, control the pump speed as required to match flow to the setpoint, and the like. Furthermore, PLC2 could, for example, compare the measured level to the setpoint, and control the flow through the valve to match level to the setpoint. SCADA systems can acquire and transmit data and are integrated with a Human Machine Interface (HMI) that provides centralized monitoring and control of numerous process inputs and outputs. The term "human machine interface," or "HMI," may denote any graphical user interface (GUI) application that allows interaction between the human operator and the controller hardware. It can also display status information and historical data gathered by the devices in the ICS environment. It is also used to monitor and configure setpoints, control algorithms, and adjust and establish parameters in the controllers.

The primary purpose of using SCADA is for long distance monitoring and control of field sites through a centralized control system. In lieu of workers having to perform tasks or gather data, a SCADA system can automate this task. Field devices, such as the Remote Terminal Unit (RTU) shown in FIG. 14, control local operations such as opening or closing of valves and breakers, collecting data from the sensor systems, and monitoring the local environment for alarm conditions. An RTU is a microprocessor-controlled field device that receives commands and sends information back to the Master Terminal Unit (MTU).

SCADA systems are commonly used in industries involving pipeline monitoring and control, water treatment centers and distribution, and electrical power transmission and distribution. On the other hand, a Distributed Control System (DCS) is a system that is used to control production systems that are found in one location. In a DCS, a setpoint is sent to the controller that is capable of instructing valves, actuators, etc. to operate in such a way that the desired setpoint is maintained. Data from the field can either be stored for future reference, used for simple process control, or used for advanced control strategies with data from another part of the plant. Each DCS uses a centralized supervisory control loop to manage local controllers or devices that are part of the overall production process. This gives industries the ability to quickly assess production and operation data. By using multiple devices within the production process, a DCS can reduce the impact of a single fault on the overall system. A DCS is commonly used in industries such as manufacturing, electric power generation, chemical manufacturing, oil refineries, and water and wastewater treatment. Every control loop consists of hardware such as PLCs and actuators. The control loop interprets signals from sensors, control valves, breakers, switches, motors, and other similar devices. The variables measured by these sensors are then transmitted to the controller to carry out a task and/or complete a process. Generally, a control server hosts the DCS or PLC supervisory control software and communicates with lower-level control devices. The SCADA Server (or MTU) functions as a device that issues commands to RTUs in the field. As shown in FIG. 14, the Data Historian is a centralized database for logging all process information within an ICS environment and then exporting data to the corporate IS. The data gathered is then used for process analysis, statistical process control, and enterprise planning. SCADA and DCS systems both incorporate intelligent electronic devices (IEDs). These are smart devices capable of acquiring data, communicating with other devices, and performing local process and control. The use of IEDs in control systems like SCADA and DCS allows for controls at the local level to be performed automatically.

In order to improve system functions and productivity, every ICS constantly incorporates new technologies and software in both information technology (IT) and operational technology (OT). IT systems are used for data-centric computing, while OT systems monitor events, processes and devices, and adjust enterprise and industrial operations. With IT and OT merged, they become bigger targets for cybercriminals. One of the common flaws to security solutions used in OT infrastructure is its inability to protect legacy control systems such as SCADA. In addition to that, organizations also have to face the rise of security challenges in new and emerging technologies, such as cloud computing, big data analytics, and the internet of things (IoT). Centralization introduces new and unknown vulnerabilities into the cyber ecosystem. In accordance with the present invention, when it is determined that that any of the ICS subsystems have been compromised (e.g., due to a bad actor who has hacked an ICS transceiver), an authorized operator can simply send a coded message, via an alternate mode of communication, to disable the transceiver and terminate unauthorized communication with the ICS.

Accordingly, as will be apparent to those skilled in the ICS arts, the present invention could be easily employed (e.g., in order to remotely override access/control of a centralized monitoring and control system by a bad actor) by integrating the control system 214 of the present invention with the SCADA centralized control system—particularly, at any location accessible by a remote controller (e.g., the RTU, MTU, etc.).

Accordingly, as will be apparent to those skilled in the ICS arts, the present invention could be easily employed (e.g., in order to remotely override access/control of a centralized monitoring and control system by a bad actor) by integrating the control system 214 of the present invention with a SCADA/DCS centralized control system; particularly, at any location accessible by a remote controller. For example, the auxiliary controller module 220 of the present invention could be integrated with an existing ICS controller instructing the operation of valves, actuators, etc.

Machine Implementation

The present invention may be incorporated into any type of a machine where it may be beneficial to provide a mechanism for remotely overriding a primary means of communicating with an operational control system, or feature, of the machine. As used herein, the term "machine" may denote any electrical or electro-mechanical machine. Moreover, the term "electrical machine" is meant to denote any device capable of inter-conversion between electrical energy and mechanical energy; that is, any machine that converts electrical energy into mechanical energy, and vice versa. Electrical machines may be further classified as stationary or dynamic electrical machines. A stationary electrical machine does not have any moving parts and remains stationary throughout its operation. For example, a transformer is a stationary electrical machine that does not have any moving parts. It is a machine because there is a conversion between electrical and magnetic energy between the windings of the transformer. On the other hand, a dynamic electrical machine consists of moving parts as well as stationary parts. For example, electrical motors and electrical generators are two types of dynamic electrical machines. In accordance with the present invention, when it is determined that that a machine has been compromised (e.g., due to a bad actor who has hacked a machine transceiver), an authorized operator can simply send a coded message, via an alternate mode of communication, to disable the transceiver and terminate unauthorized communication with the machine.

Electronic Device Implementation

Furthermore, the invention may be implemented into any type of electrical, or electronic, device where it may be beneficial to provide a mechanism for remotely overriding a primary means of communicating with an operational system of the device. As used herein, the terms "electrical device" and "electronic device" may be used to denote any device that uses or generates electricity and transforms it into another form of energy, such as motion, heat or light. Electrical devices differ from electronic devices in that an electronic device (e.g., a modern smart device) uses complex manipulation of electricity to perform additional actions by utilizing the electronic current to, for example, add audio or visual information.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention is not limited to the embodiments disclosed as the best mode contemplated for carrying out this invention, but that the invention will include all the embodiments falling within the scope of the appended claims.

What is claimed is:

1. A method for remotely reestablishing operational control of a function of a device after operational control of the device function has been lost, at least partially, due to malicious interference by a third party, the method comprising steps of:
   integrating an onboard primary controller into the device, wherein the onboard primary controller is adapted to control at least one function of the device;
   providing a base controller adapted to communicate with the onboard primary controller via a first mode of communication in order to provide instructions by which said onboard primary controller is to control said at least one device function; and
   integrating an auxiliary controller module into the device, wherein the auxiliary controller is adapted to communicate with the base controller via a second mode of communication different from the first mode of communication between said onboard primary controller and said base controller, such that said auxiliary controller module functions as a backup to temporarily take over control of said at least one device function, in place of said onboard primary controller, when said at least one device function is rendered non-responsive to operator-attempted communication from said base controller to said onboard primary controller,
   wherein communication from said base controller to said auxiliary controller module, via said second mode of communication, relies upon a coded messaging scheme requiring communication of a predetermined specific code, from said base controller to said auxiliary controller module, which activates said auxiliary controller module to disable, and take over control from, said onboard primary controller in response to receipt of said predetermined specific code, and wherein said predetermined specific code is known only by the operator of said base controller and by said auxiliary controller module.

2. The method recited in claim 1, wherein said first mode of communication between said base controller and said onboard primary controller further comprises radio frequency signals.

3. The method recited in claim 2, wherein said second mode of communication between said base controller and said auxiliary controller module further comprises cellular signals.

4. The method recited in claim 1, wherein said first mode of communication between said base controller and said onboard primary controller further comprises cellular signals.

5. The method recited in claim 4, wherein said second mode of communication between said base controller and said auxiliary controller module further comprises radio frequency signals.

6. The method recited in claim 1, wherein the coded messaging scheme associated with said second mode of communication between said auxiliary controller module and said base controller further comprises a coded short message service messaging scheme employing a predetermined specific code that activates said auxiliary controller module to take over control from said onboard primary controller in response to receipt of said specific code.

7. The method recited in claim 1, wherein said auxiliary controller module includes a global system for mobile communications (GSM) module.

8. The method recited in claim 7, wherein said second mode of communication between said auxiliary controller module and said base controller operates in accordance with a set of GSM standards utilizing a subscriber identity module (SIM) card and employing a short message service (SMS) messaging that communicates with said auxiliary controller module, and sends a text message to said auxiliary controller module that incorporates a predetermined authentication code and specific code, which activate said auxiliary controller module to take over control from said onboard primary controller in response to receipt of said authentication code and specific code.

9. The method recited in claim 1, wherein the auxiliary controller module integrated into the device further comprises:
   a global system for mobile communications (GSM) module;
   a global positioning system (GPS) receiver;
   a communications transmitter/receiver; and
   a processor unit and power supply for enabling operation of said GSM module, GPS receiver and communications transmitter/receiver.

10. The method recited in claim 9, wherein the GPS receiver is adapted to determine coordinates of the location of said auxiliary controller module.

11. The method recited in claim 9, wherein said GSM module operates in accordance with a set of GSM standards for receiving a mode of communication utilizing a subscriber identity module (SIM) card and a short message service (SMS) messaging that communicates with and receives a text message embodying a predetermined specific code that activates said auxiliary controller module to take over control in place of an onboard primary controller in response to receipt of said specific code.

12. The method recited in claim 1, wherein the device is integrated with an autonomous vehicle.

13. The method recited in claim 1, wherein the device is integrated with a semi-autonomous vehicle.

14. The method recited in claim 1, wherein the device is integrated with a water craft.

15. The method recited in claim 14, wherein the water craft further comprises a non-autonomous ship.

16. The method recited in claim 15, wherein the device is integrated in-line with a power wire connecting power to a control center on a bridge of said non-autonomous ship.

17. The method recited in claim 1, wherein the device is integrated with an industrial plant.

18. The method recited in claim 17, wherein device further comprises at least one of a software switch and a hardware switch.

\* \* \* \* \*